(12) United States Patent
Ford et al.

(10) Patent No.: US 12,367,342 B1
(45) Date of Patent: Jul. 22, 2025

(54) AUTOMATED ANALYSIS OF COMPUTERIZED CONVERSATIONAL AGENT CONVERSATIONAL DATA

(71) Applicant: Conversational AI Ltd, Saltford (GB)

(72) Inventors: Darren Ford, Saltford (GB); Allison Adams, Chicago, IL (US); Alice Kerly, Bristol (GB); Allan Osmond, Bath (GB); Joe Yelland, London (GB)

(73) Assignee: Conversational AI Ltd, Saltford (GB)

( * ) Notice: Subject to any disclaimer, the term of this patent is extended or adjusted under 35 U.S.C. 154(b) by 0 days.

(21) Appl. No.: 19/022,237

(22) Filed: Jan. 15, 2025

(51) Int. Cl.
| | |
|---|---|
| *G06F 40/30* | (2020.01) |
| *G06F 40/205* | (2020.01) |
| *G06F 40/279* | (2020.01) |
| *H04L 51/02* | (2022.01) |
| *G06F 16/583* | (2019.01) |
| *G06F 16/683* | (2019.01) |
| *G06F 16/783* | (2019.01) |

(52) U.S. Cl.
CPC .......... *G06F 40/279* (2020.01); *G06F 40/205* (2020.01); *H04L 51/02* (2013.01); *G06F 16/5846* (2019.01); *G06F 16/685* (2019.01); *G06F 16/7844* (2019.01)

(58) Field of Classification Search
CPC .... G06F 40/211; G06F 40/253; G06F 40/268; G06F 40/284; G06F 40/30; G06F 16/00; G06F 16/144; G06F 16/148; G06F 16/156; G10L 15/00; G06N 3/08

See application file for complete search history.

(56) References Cited

U.S. PATENT DOCUMENTS

| | | | |
|---|---|---|---|
| 10,169,319 B2 | 1/2019 | Connell, II et al. | |
| 10,592,613 B2 | 3/2020 | Gupta et al. | |
| 10,832,002 B2 | 11/2020 | Kozhaya et al. | |
| 10,884,598 B2 | 1/2021 | Bhatt et al. | |
| 10,924,933 B2 | 2/2021 | Pinder et al. | |
| 11,010,704 B2 | 5/2021 | Kulkarni et al. | |
| 11,012,381 B2 | 5/2021 | Chavda | |
| 11,159,457 B2 * | 10/2021 | Liang | G06F 40/279 |
| 11,184,298 B2 | 11/2021 | Freed et al. | |
| 11,496,422 B2 | 11/2022 | Higgins et al. | |
| 11,615,363 B2 | 3/2023 | Narayan et al. | |
| 11,714,855 B2 | 8/2023 | Mahindru et al. | |
| 11,726,902 B1 | 8/2023 | Ganesan et al. | |
| 11,855,934 B2 | 12/2023 | Menon et al. | |

(Continued)

FOREIGN PATENT DOCUMENTS

DE      102021109265 A1      3/2022

*Primary Examiner* — Lamont M Spooner
(74) *Attorney, Agent, or Firm* — Boon Intellectual Property Law, PLLC; Brian S. Boon

(57) ABSTRACT

A system and method for automated qualitative analysis of computerized conversational agent (CCA) conversational data. In an embodiment, the system comprises a system configuration manager for establishing CCA characteristics and factors to be included in analyses, a data ingestion engine for ingesting conversations from a CCA, a conversation indicator extractor for identifying and classifying key aspects of conversations, a fallback analyzer for identifying the type and frequency of CCA failures, a topic modeling engine for identifying trends in conversations, and a CCA score generator for generating score assessments for qualitative aspects of the CCA's performance.

16 Claims, 21 Drawing Sheets

(56) References Cited

U.S. PATENT DOCUMENTS

| | | | |
|---|---|---|---|
| 2005/0251735 A1* | 11/2005 | Dunietz | G06F 40/143 |
| | | | 715/255 |
| 2009/0282013 A1* | 11/2009 | Joshi | G06F 16/951 |
| | | | 707/999.005 |
| 2017/0243134 A1 | 8/2017 | Housman | |
| 2018/0165723 A1 | 6/2018 | Wright et al. | |
| 2019/0042988 A1* | 2/2019 | Brown | G06F 16/9535 |
| 2019/0068527 A1* | 2/2019 | Chen | G06F 40/216 |
| 2019/0259036 A1* | 8/2019 | Chakraborty | G06N 3/044 |
| 2019/0333118 A1 | 10/2019 | Crimmins et al. | |
| 2020/0004874 A1* | 1/2020 | Gupta | G10L 15/22 |
| 2020/0125678 A1* | 4/2020 | Conley | G06F 16/35 |
| 2020/0175089 A1* | 6/2020 | Villarreal | H04L 67/60 |
| 2020/0342032 A1* | 10/2020 | Subramaniam | G06N 3/006 |
| 2021/0082400 A1* | 3/2021 | Vishnoi | G06F 40/30 |
| 2021/0144107 A1* | 5/2021 | Liang | G06N 5/04 |
| 2021/0201144 A1 | 7/2021 | Jonnalagadda et al. | |
| 2021/0209441 A1 | 7/2021 | Sivakumar et al. | |
| 2021/0243141 A1* | 8/2021 | Parekh | H04L 51/212 |
| 2021/0303798 A1* | 9/2021 | Duong | H04L 51/02 |
| 2021/0304074 A1* | 9/2021 | Zaremoodi | G06N 3/006 |
| 2021/0304075 A1* | 9/2021 | Duong | G06F 40/35 |
| 2021/0304733 A1* | 9/2021 | Jalaluddin | G10L 15/26 |
| 2021/0319347 A1* | 10/2021 | Vishnoi | G06F 11/3409 |
| 2021/0350263 A1* | 11/2021 | Koneru | G06N 5/043 |
| 2022/0050751 A1* | 2/2022 | Hazra | G06F 11/3006 |
| 2022/0100961 A1* | 3/2022 | Vishnoi | G06F 40/35 |
| 2022/0171946 A1* | 6/2022 | Xu | G06N 3/08 |
| 2022/0171947 A1* | 6/2022 | Xu | G06N 3/048 |
| 2022/0284059 A1 | 9/2022 | Kalandyk et al. | |
| 2022/0398231 A1* | 12/2022 | Luby | G06F 16/283 |
| 2023/0036072 A1 | 2/2023 | Gao | |
| 2023/0289167 A1 | 9/2023 | Gangireddy | |
| 2023/0351257 A1* | 11/2023 | Mourya | G06N 20/00 |
| 2023/0393965 A1 | 12/2023 | Hiremath et al. | |
| 2024/0012841 A1 | 1/2024 | Voyles et al. | |
| 2024/0412720 A1* | 12/2024 | Vasylyev | G06F 16/90332 |
| 2024/0414106 A1* | 12/2024 | Swaminathan | G06F 8/658 |

* cited by examiner

Conversation Indicator Extraction Algorithm 800

Conversation Indicator Extraction Pseudocode Example 900

901 → FUNCTION is_question(sentence):

902 →
Define a set of common question words
SET question_words = {
   "who", "what", "when", "where", "why", "how",
   "do", "does", "did", "is", "are", "was", "were",
   "can", "could", "will", "would", "should",
   "may", "might", "shall", "couldn't", "shouldn't",
   "wouldn't", "can't", "don't", "doesn't",
   "isn't", "aren't", "won't", "haven't", "hasn't",
   "hadn't"
}

903 →
Check if the sentence ends with a question mark
IF sentence ends with "?":
   RETURN True 904 →
Sanitize the first word by removing punctuation and converting to lowercase
SET first_word = extract_first_word(sentence)
SET sanitized_first_word = remove_punctuation(first_word).toLowerCase()   # Check if the sanitized first word is in the set of question words
IF sanitized_first_word IN question_words:
   RETURN True 905 →
If neither condition is met, return False
RETURN False 906 →
FUNCTION extract_first_word(sentence):
Split the sentence into words and return the first word
SET words = split(sentence)
RETURN words[0]

907 →
FUNCTION remove_punctuation(word):
Remove punctuation from the word
RETURN word.translate(punctuation_table)

FIG. 9

Exemplary Fallback Type Discrimination Pseudocode 1100

```
prompt_json = {
  "messages": [
    {
      "role": "system",
      "content": "You are an assistant categorizing the fallback type in a
Conversational AI (CAI) system. A fallback is triggered when the system cannot
understand or respond. The two fallback types are:
      - 'PROMPT' when the system expects a specific response but receives an
unexpected user input.
      - 'INTENT' when the system cannot determine the user's intent.
If the type is unclear, respond with 'UNKNOWN'."
    },
    {
      "role": "user",
      "content": "Agent: When you are ready, say ready. User: How do I find my
serial number? Agent: I'm sorry, I didn't get that."
    },
    {
      "role": "assistant",
      "content": "PROMPT"
    },
    {
      "role": "user",
      "content": "Agent: How can I help you today? User: How much does a plan
cost? Agent: I'm sorry, I didn't get that, try again using different words."
    },
    {
      "role": "assistant",
      "content": "INTENT"
    }
  ]
}
content_template = "agent: {agent_prompt} user: {user_response} agent:
{fallback}"
new_message = {
    "role": "user",
    "content": content_template
}
prompt_json['messages'].append(new_message)
```

- 1101 → prompt_json = {
- 1102 → system message
- 1103 → fallback type descriptions
- 1104 → PROMPT example
- 1105 → INTENT example
- 1106 → content_template and new_message

FIG. 11

Topic Modeling Engine Algorithm 1200  FIG. 12

Topic Generation Stage 1210

1211 Receive a labeled list of topics (e.g., key value pairs where the key corresponds to the desired topic label and the values are a list of keyword strings the administrator wishes to be associated with that topic) from an administrator as seed material for guided topic modeling [optional]

1212 Sample currently-assigned and previously-assigned topic labels from a data store of such topic labels on a rolling window (e.g., past 7 days).

1213 Provide the labeled list of topics, if any, and sampled topic labels as data to a natural language understanding (NLU) engine with instructions to assign topic labels to the data (e.g., as TF-IDF, short for Term Frequency–Inverse Document Frequency keywords)

1214 Send the assigned topic labels and a list of frequently-occurring labels (e.g., from the data store of such labels) to a natural language generation (NLG) engine to generate human-readable labels corresponding to the assigned topic labels.

Topic Smoothing Stage 1220

1221 Sample a set of frequently-occurring topics in the data store (e.g., the top n most frequency-occurring topic labels) as seeded topics.

1222 Retrieve topic cluser IDs from the data store associated with the sampled seeded topics.

1223 Send the seeded topics and topic cluser IDs to an NLG engine to assign topic labels to the assigned topic labels with instructions to:

- if the keywords fit an existing list of guided topic labels (the seeded and top n labels), then assign the most appropriate topic label from the list of guided topic labels (the seeded and top n labels)
- if the keywords do not fit an existed guided label, assign a label based on the NLG engine's own judgement as to a lable it thinks is most appropriate for the given list of keywords Exemplary Topic Modeling Pseudocode 1300

1301 → I have a set of indices and associated keywords, as follows:
{keywords_json}

1302 → For each index, generate a JSON structure where each index is associated with two topic labels:
A guided topic label based on the provided topic list, and
An unguided topic label that reflects the common theme of the keywords for that index.

1303 → Specific instructions for generating the topic labels:
The guided topic label must be chosen from the topic list below. If the keywords do not directly match a topic in this list, assign the label "Unknown."
If the keywords suggest that the user wants to speak to a person, assign the guided label "Agent Request," overriding other label choices.
The unguided topic label should be generated independently of the topic list, purely based on the common theme of the keywords for that index. Do not reuse any punctuation in this label; words should be separated by spaces only and capitalized.
Ensure consistency across runs by using inflections of the same noun only once (e.g., use "request" instead of "requests").
When generating the unguided label, attempt to match any close or semantically related topics from the guided list, if applicable, before creating new labels.

1304 → Guided Topic List:
{topic_list}

1305 → Format the output as a valid JSON object with the following structure:
{
  "index1": ["guided_topic_label1", "unguided_topic_label1"],
  "index2": ["guided_topic_label2", "unguided_topic_label2"],
  ...

FIG. 13

CCA Score Generation Algorithm 1400

Exemplary CCA Score Weighting Functions 1500

1501 → In an embodiment, a CCA score weighting function may be based on the frequency of each negative indicator within the CCA's transcript data. Weights may be applied to each indicator frequency score according to importance. The resulting score may be represented as a percentage.

1502 → An exemplary scoring function may be defined as:

Weighted Score = $(w_1 \times s_1) + (w_2 \times s_2) + ... + (w_n \times s_n)$
Where:
- $w_1, w_2, ..., w_n$ are the weights (relative importance for each indicator, total values sum up to 1).
- $s_1, s_2, ..., s_n$ are the corresponding scores for each indicator.
- n is the total number of components being weighted.

Exemplary negative indicator scores to be weighted by the scoring function may include, but are not limited to:

| | | |
|---|---|---|
| 1503 → | Fallback score | Frequency of fallback messages as a percentage of total agent messages for a given time period. |
| 1504 → | Error Score | Frequency of error messages as a percentage of total agent messages for a given time period. |
| 1505 → | Negative sentiment score | Frequency of conversations containing a customer message indicating the customer was angry as a percentage of all conversations for a given time period. |
| 1506 → | Repeated Agent message score | Frequency of repeated agent messages as a percentage of total agent messages for a given time period. |
| 1507 → | Repeated Customer message score | Frequency of repeated customer messages as a percentage of total customer messages for a given time period. |
| 1508 → | Agent request score | Frequency of customer messages containing an agent request as a percentage of total customer messages for a given time period. |
| 1509 → | Agent abandonment score | Frequency of conversations indicating the agent abandoned the conversation as a percentage of the total number of conversations for a given time period. |
| 1510 → | Customer abandonment score | Frequency of conversations indicating the customer abandoned the conversation as a percentage of the total number of conversations for a given time period. |

FIG. 15

AUTOMATED ANALYSIS OF COMPUTERIZED CONVERSATIONAL AGENT CONVERSATIONAL DATA

CROSS-REFERENCE TO RELATED APPLICATIONS

The following patent applications are expressly incorporated herein by reference in their entireties:
none

BACKGROUND

Field of the Art

The present invention is in the field of computer technology, and more particularly to automated analysis of conversational data produced by computerized conversational agents.

Discussion of the State of the Art

Computerized conversational agents (CCAs) such as chatCCAs, interactive voice response (IVR) systems, conversational artificial intelligence (AI) systems, etc., are computer programs designed to have conversations with humans, typically by text or voice. Businesses use computerized conversational agents to improve the operational efficiency of their human contact centre agents, by offloading manual and repetitive tasks (e.g. identification and verification or processing of credit card details) to computerized conversational agents, enabling human agents to spend more time on complex tasks that require human attention. Computerized conversational agents are often used in customer service environments, obtaining background information from customers contacting the business in an attempt to assist customers with their inquiries, such as directing customers to the proper department or representative, making an initial attempt troubleshoot customer problems with a product or service, or obtaining account numbers and security information to verify customers' identities.

Computerized conversational agents are designed to allow for natural language inputs and outputs, mimicking natural human conversations which, in theory, provide greater ease of use and better outcomes. However, in actual use, CCAs often fail to achieve their goals, leading to a frustrating user experience. Human conversations are complex and subtle, and CCAs can often fail to understand the user's inquiry or fail to provide appropriate responses, leading to failure of the system to achieve the goal of helping the user.

While there are automated systems for providing quantitative analysis of CCAs, the only existing way to perform qualitative analysis of CCAs is through human review, wherein humans select a small sample of conversations of a given CCA, qualitatively evaluate the CCA's performance, and make manual corrections and changes to the CCA's operation where the CCA is failing to perform as intended. Unfortunately, this manual sampling and correction by humans is inherently limited in scale. It cannot comprehensively analyze the performance of large-scale CCAs (e.g., those having thousands or millions of conversations or more) by analyzing all conversations in the CCA, or identify exceptional cases which are unlikely to come up in sampling, or troubleshoot complex errors in CCA operation that may result from links between many conversations or conversational aspects. Further, manual sampling and analysis cannot take into account external factors such as a business' objectives and key performance indicators (KPIs), so is unable to optimize a CCA for the purposes of a given business or to optimize a CCA for a particular context, such as certain industries or fields of operation.

More recent innovations in CCAs make manual sampling and human correction even more difficult and less reliable. Some Conversational AI systems, for example, are black boxes. Their operation has been generated by training a machine learning algorithm on sample conversational inputs and outputs. However, it is not possible to know exactly how the machine learning algorithm has structured its internal rules, so unless a comprehensive qualitative analysis of the conversational AI's conversations is conducted, it may not be possible to re-train the machine learning algorithm to fix the problem. For example, Large Language Models (LLMs) are often used in conversational AI systems, and can generate so-called "hallucinations," which are generation of content that is irrelevant, made-up, misleading, or inconsistent with the input data. The source of LLM hallucinations is extremely difficult to identify and correct using current manual methods.

What is needed is a system and method for automated qualitative analysis of computerized conversational agent (CCA) conversational data allowing for comprehensive conversational analysis of CCAs even at large scale, and in some embodiments, one that is capable of accounting for external factors and contexts.

SUMMARY

Accordingly, the inventor has conceived and reduced to practice, a system and method for automated qualitative analysis of computerized conversational agent (CCA) conversational data. In an embodiment, the system comprises a system configuration manager for establishing CCA characteristics and factors to be included in analyses, a data ingestion engine for ingesting conversations from a CCA, a conversation indicator extractor for identifying and classifying key aspects of conversations, a fallback analyzer for identifying the type and frequency of CCA failures, a topic modeling engine for identifying trends in conversations, and a CCA score generator for generating score assessments for qualitative aspects of the CCA's performance.

According to a preferred embodiment, a system for automated analysis of computerized conversational agent (CCA) conversational data is disclosed, comprising: a computer system comprising a memory, a processor, and a data store residing on a non-volatile data storage device; a conversation indicator extractor comprising a first plurality of programming instructions stored in the memory which, when operating on the processor, causes the computer system to: receive transcript data for analysis, the transcript data comprising text of one or more conversations between a computerized conversational agent (CCA) and a user, each conversation comprising a plurality of messages, each message being labeled as having been authored either by the CCA or by the user; analyze the messages to extract one or more conversational indicators for the one or more conversations; associate each conversational indicator with one or more messages of the plurality of messages from which the conversational indicator was extracted; and store the conversational indicators and their message associations in the data store; a fallback analyzer comprising a second plurality of programming instructions stored in the memory which, when operating on the processor, causes the computer system to: retrieve from the non-volatile data storage device messages associated with a fallback indicator; for each retrieved message: extract fallback content from the conversation, the fallback content comprising: an agent message indicated as containing a fallback message; a customer message preceding the fallback message; and an agent message that elicited the customer message preceding the fallback message; send the fallback content to an artificial intelligence assistant (AI assistant) with instructions to the AI assistant to assign a fallback type for the fallback message as either intent-based or prompt-based; and store the assigned fallback type in the data store; a topic modeling engine comprising a third plurality of programming instructions stored in the memory which, when operating on the processor, causes the computer system to: sample data from the data store according to a sampling time window; send the sample data to a natural language understanding (NLU) engine with instructions to generate a list of frequently-occurring topic labels in the form of a term-frequency inverse document frequency (TF-IDF) list; receive the TF-IDF list from the NLU engine; receive a list of labeled topics from an administrator, or from the data store, or both; send the TF-IDF list and the list of labeled topics to a natural language generation (NLG) engine with instructions to assign natural language topic labels for the sample data, wherein the instructions comprise directives to: assign a topic label from the list of labeled topics if terms in the TF-IDF list fit a label from the list of labeled topics; and assign a topic label from the NLG engine's own judgment if terms in the TF-IDF list do not fit a label from the list of labeled topics; and store the assigned topic labels in the data store; a CCA score generator comprising a fourth plurality of programming instructions stored in the memory which, when operating on the processor, causes the computer system to: generate a numerical indicator of conversation quality for one or more of the one or more conversational indicators; and display the numerical indicator to an administrator, the display comprising a link from the numerical indicator to one or more messages associated with the conversational indicator.

According to a preferred embodiment, a method for automated analysis of computerized conversational agent (CCA) conversational data is disclosed, comprising the steps of: using a software conversation indicator extractor operating on a computer system comprising a memory, a processor, and a data store residing on a non-volatile data storage device to perform the steps of: receiving transcript data for analysis, the transcript data comprising text of one or more conversations between a computerized conversational agent (CCA) and a user, each conversation comprising a plurality of messages, each message being labeled as having been authored either by the CCA or by the user; analyzing the messages to extract one or more conversational indicators for the one or more conversations; associating each conversational indicator with one or more messages of the plurality of messages from which the conversational indicator was extracted; and storing the conversational indicators and their message associations in the data store; using a software fallback analyzer operating on the computer system to perform the steps of: retrieving from the non-volatile data storage device messages associated with a fallback indicator; for each retrieved message: extracting fallback content from the conversation, the fallback content comprising: an agent message indicated as containing a fallback message; a customer message preceding the fallback message; and an agent message that elicited the customer message preceding the fallback message; sending the fallback context to an artificial intelligence assistant (AI assistant) with instructions to the AI assistant to assign a fallback type for the fallback message as either intent-based or prompt-based; and storing the assigned fallback type in the data store; using a software topic modeling engine operating on the computer system to perform the steps of: sampling data from the data store according to a sampling time window; sending the sample data to a natural language understanding (NLU) engine with instructions to generate a list of frequently-occurring topic labels in the form of a term-frequency inverse document frequency (TF-IDF) list; receiving the TF-IDF list from the NLU engine; receiving a list of labeled topics from an administrator, or from the data store, or both; sending the TF-IDF list and the list of labeled topics to a natural language generation (NLG) engine with instructions to assign natural language topic labels for the sample data, wherein the instructions comprise directives to: assign a topic label from the list of labeled topics if terms in the TF-IDF list fit a label from the list of labeled topics; and assign a topic label from the NLG engine's own judgment if terms in the TF-IDF list do not fit a label from the list of labeled topics; and storing the assigned topic labels in the data store; using a software CCA score generator operating on the computer system to perform the steps of: generating a numerical indicator of conversation quality for one or more of the one or more conversational indicators; and displaying the numerical indicator to an administrator, the display comprising a link from the numerical indicator to one or more messages associated with the conversational indicator.

According to an aspect of an embodiment, the computer system is at least in part a cloud-based, distributed system.

According to an aspect of an embodiment, the conversational indicators extracted comprise one or more of the following types: system message indicators, error message indicators, word count indicators, fallback message indicators, escalation message indicators, response time indicators, conversation turns indicators, agent request indicators, profanity indicators, repeated message indicators, and user abandoned conversation indicators.

According to an aspect of an embodiment, the CCA score generator is further configured to perform the step of generating an overall CCA score comprising a weighted scoring of the types of conversational indicators extracted.

According to an aspect of an embodiment, a configuration manager is used to perform the steps of: receiving a CCA profile from the administrator, the CCA profile comprising one or more of the following: a name of the CCA, a location from which CCA data can be retrieved, and handover support information for the CCA; receiving one or more objectives from the administrator for analysis of the transcript data; and receiving one or more feature selections from the administrator for analysis of the transcript data.

According to an aspect of an embodiment, a software CCA score script generator is used to to perform the steps of: generating scripts that combine the profile, objectives, and feature selections into a set of data processing rules that may be used by the CCA score generator to generate the numerical indicators of conversation quality for the one or more of the one or more conversational indicators; or generating an overall CCA score comprising a weighted scoring of the one or more conversational indicators; or both.

According to an aspect of an embodiment, a software data ingestion engine is used to perform the steps of: receiving CCA data; where the CCA data is not a transcript, converting the CCA data into a transcript; parsing the transcript into one or more conversations, the conversations comprising one or more messages between the CCA and the user; labeling each of the one or more messages in the conversations as being from the CCA or from the user; and outputting the transcript data comprising text of one or more conversations between a computerized conversational agent (CCA) and a user, each conversation comprising a plurality of messages, each message being labeled as having been authored either by the CCA or by the user.

According to an aspect of an embodiment, the conversion of the CCA data into a transcript is performed by an automated speech engine in the case of audio CCA data, or by an image-to-text or video-to-text processor for image or video CCA data.

BRIEF DESCRIPTION OF THE DRAWING FIGURES

FIG. 9 is a flow diagram illustrating exemplary pseudocode for assessing whether a sentence in a given conversation is a question for automated analysis of computerized conversational agent conversational data.

FIG. 11 is a flow diagram illustrating exemplary pseudocode for instructing an LLM to perform fallback type discrimination for automated analysis of computerized conversational agent conversational data.

FIG. 12 is a flow diagram illustrating an exemplary algorithm for topic modeling for automated analysis of computerized conversational agent conversational data.

FIG. 13 is a flow diagram illustrating exemplary pseudocode for instructing an NLG to generate topic topics for automated analysis of computerized conversational agent conversational data.

FIG. 15 is a flow diagram illustrating exemplary weighting function for CCA score generation for automated analysis of computerized conversational agent conversational data.

DETAILED DESCRIPTION

Figure 1:
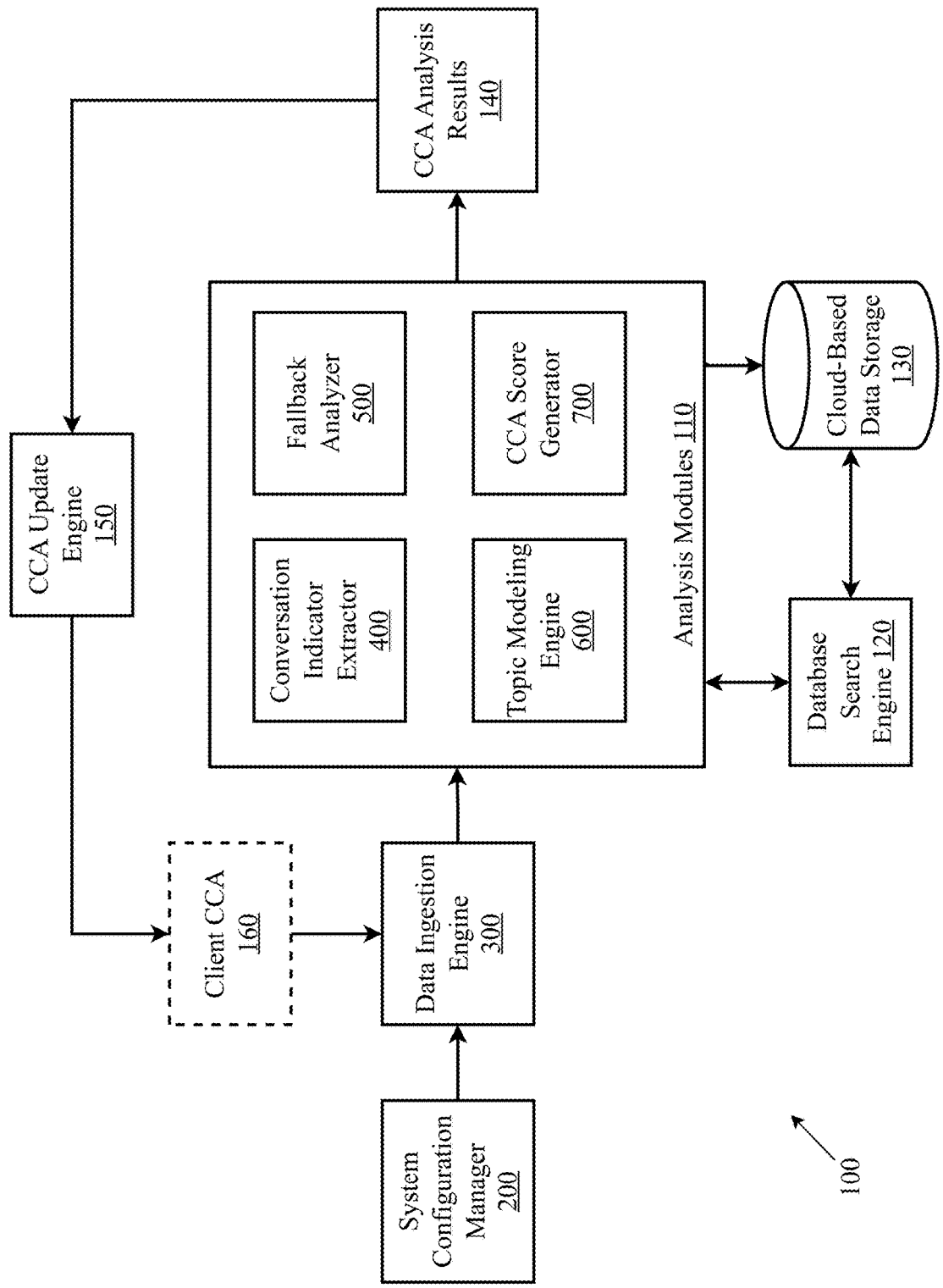
FIG. 1 is a block diagram illustrating an exemplary system architecture for an automated conversational analysis system for computerized conversational agents.

The inventor has conceived, and reduced to practice, a system and method for automated qualitative analysis of computerized conversational agent (CCA) conversational data. In an embodiment, the system comprises a system configuration manager for establishing CCA characteristics and factors to be included in analyses, a data ingestion engine for ingesting conversations from a CCA, a conversation indicator extractor for identifying and classifying key aspects of conversations, a fallback analyzer for identifying the type and frequency of CCA failures, a topic modeling engine for identifying trends in conversations, and a CCA score generator for generating score assessments for qualitative aspects of the CCA's performance.

Computerized conversational agents (CCAs) such as chatCCAs, interactive voice response (IVR) systems, conversational artificial intelligence (AI) systems, etc., are computer programs designed to have conversations with humans, typically by text or voice. Businesses use computerized conversational agents to improve the operational efficiency of their human contact centre agents, by offloading manual and repetitive tasks (e.g. identification and verification or processing of credit card details) to computerized conversational agents, enabling human agents to spend more time on complex tasks that require human attention. Computerized conversational agents are often used in customer service environments, obtaining background information from customers contacting the business in an attempt to assist customers with their inquiries, such as directing customers to the proper department or representative, making an initial attempt to troubleshoot customer problems with a product or service, or obtaining account numbers and security information to verify customers' identities.

Computerized conversational agents (also sometimes known as "dialog agents") are a class of computer programs designed to have, or at least mimic, conversations with humans in order to obtain information and assist with various activities such as routing to a particular agent, troubleshooting a problem with a product or service, or to provide requested information. Depending on their configuration, CCAs can have conversations via typewritten text, handwritten text, speech, or even gestures such as sign language. The most common types of CCAs are chatCCAs (primarily typed-text-based, such as via a website) and interactive voice response (IVR) systems (primarily voice-based, such as over the telephone), although CCAs can be configured to have conversations using handwritten text and gestures. There are three primary CCA models: rule-based CCAs which use lists of pre-defined rules to process queries and responses, statistically-enhanced CCAs which are primarily rule-based but are enhanced with some predictive language capabilities, and artificial intelligence (AI) based CCAs which use trained neural networks (of which large language models (LLMs) are one type) to process language in a manner mimicking that of the human brain.

Computerized conversational agents (CCAs) are designed to allow for natural language inputs and outputs, mimicking natural human conversations which, in theory, provide greater case of use and better outcomes. However, in actual use, CCAs often fail to achieve their goals, leading to a frustrating user experience. Human conversations are complex and subtle, and CCAs can often fail to understand the user's inquiry or fail to provide appropriate responses, leading to failure of the system to achieve the goal of helping the user.

While there are automated systems for providing quantitative analysis of CCAs, quantitative analysis provides only statistical data about how often things are occurring with a CCA. For example, quantitative analysis can provide numerical data about how many conversations have been had, the length of those conversations, whether those conversations were routed to an agent, and similar data. However, none of these statistics provides information about how well a CCA is working (i.e., whether it is properly understanding the user, providing relevant information in response, and importantly, whether it is achieving the goals that its operators intend for it to achieve).

Only qualitative analysis can provide information about how well a CCA is performing, but existing automated conversational analysis systems cannot perform qualitative analysis. The only existing way to perform qualitative analysis of CCAs is through human review, wherein humans select a small sample of conversations of a given CCA, qualitatively evaluate the CCA's performance, and make manual corrections and changes the CCA's operation where the CCA is failing to perform as intended. Unfortunately, this manual sampling and correction by humans is inherently limited in scale. It cannot comprehensively analyze the performance of large-scale CCAs (e.g., those having thousands or millions of conversations or more) by analyzing all conversations in the CCA, or identify exceptional cases which are unlikely to come up in sampling, or troubleshoot complex errors in CCA operation that may result from links between many conversations or conversational aspects. Further, manual sampling and analysis cannot take into account external factors such as a business' objectives and key performance indicators (KPIs), so is unable to optimize a CCA for the purposes of a given business or to optimize a CCA for a particular context, such as certain industries or fields of operation.

More recent innovations in CCAs make manual sampling and human correction even more difficult and less reliable. Some conversational AI systems, for example, are black boxes. Their operation has been generated by training a machine learning algorithm on sample conversational inputs and outputs. However, it is not possible to know exactly how the machine learning algorithm has structured its internal rules, so unless a comprehensive qualitative analysis of the conversational AI's conversations is conducted, it may not be possible to re-train the machine learning algorithm to fix the problem. For example, Large Language Models (LLMs) are often used in conversational AI systems, and can generate so-called "hallucinations," which are generation of content that is irrelevant, made-up, misleading, or inconsistent with the input data. The source of LLM hallucinations is extremely difficult to identify and correct using current manual methods.

The system and method described herein provide a solution to the problems described above by allowing for comprehensive, large-scale, automated, and qualitative conversational analysis of CCAs. The system and method use custom-built algorithms to extract conversation indicators (e.g. system message indicators, CCA error message indicators, fallback message indicators, escalation message indicators, profanity indicators, etc.) to determine what conversational qualities the conversation possesses, and to process the conversations through a topic modeling engine to determine what types of issues the CCA is encountering on a regular basis (e.g., over a 7-day window). The system and method further use a unique methodology to discriminate between fallback message types, providing additional information about CCA failures. Primary analysis is undertaken to gather basic data points, such as number of messages in each conversation, message lengths, and whether an error was encountered during a conversation. Conversation data is augmented with these additional basic data points in a proprietary database. Conversations are then analyzed against a set of features which are derived from industry best practices and conversational AI expertise. Features may include measurements such as identifying overly-long CCA messages, understanding how often the CCA repeats itself during a conversation, what the outcome of each conversation was, and what the topic of each conversation was, amongst others. The system and method may provide improvement recommendations based on scoring of the various conversational qualities and topics. In some embodiments, the system and method may automatically adjust a CCA to correct conversational quality problems by, for example, re-writing conversational rules for rule-based CCAs or by retraining a conversational AI CCA using labeled conversation training data containing corrections.

For each of the features, the platform allows an administrator to quickly view example conversations matching each segment of the feature analysis. This in itself removes a huge time burden from administrators who often have to manually review conversations at random and therefore cannot see the patterns or correlations from the bigger picture. While the analyses are automated, the system provides a framework for detailed manual review of relevant conversations organized by objective so that administrators can immediately see a given problem with CCA quality in the context of a defined objective rather than having to manually search for conversations with similar quality issues.

The system and method described herein provide CCA administrators with the insight and evidence for improvement of the quality of conversations of the CCA by suggesting actionable steps to improve the conversational experience. While existing tools focus purely on quantitative metrics such as conversational duration, time-of-day usage, etc., the system and method described herein evaluate qualitative aspects of conversations, analyzing why, how, and how well the CCA operates, rather than simply providing quantitative numbers such as number of messages, conversation times and durations, etc. The qualitative analysis results generated by the system and method described herein are interpreted and displayed numerically to allow for easy understanding and historic comparison, but this should not be confused with quantitative analysis. The qualitative analysis results generated by the system and method described herein provide statistical information about qualities of the conversations held by the CCA, not mere quantities of events occurring within the data.

Some benefits of the system and method described herein include enabling businesses who utilize CCAs to measure CCA quality and improve associated business metrics (such as improving sales) and user experience (increasing the number of successful CCA outcomes); identifying statistically relevant areas of improvement by analyzing large volumes of CCA conversations (in some embodiments including every single CCA conversation), even when internal business processes or external environmental factors are changing; removing human bias from the qualitative CCA analysis, increasing consistency of CCA analysis; identifying conversational AI hallucinations and AI intent recognition errors; and increasing productivity of teams responsible for maintenance and improvement of CCAs.

The system and method described herein can, in some embodiments, analyze every single conversation of a CCA against a wide range of conversational indicators and metrics to identify how well the CCA is performing and to pinpoint areas for improvement or correction in accordance with business objectives. In some embodiments, analyses may be run in batches (e.g., automatically run overnight, so that insights are ready for users to review the next day), while in other embodiments analyses may be run periodically or continuously.

Further, in some embodiments, the system and method described herein may take into consideration business objectives when making CCA correction recommendations by allowing users to define additional custom objectives, enabling businesses to ensure the recommendations are based on their own goals or key performance indicators (KPIs). In these embodiments, CCA correction recommendations may emphasize or de-emphasize certain analysis results depending on the additional custom objectives entered. For example, if a CCA is found to have a high number of fallback errors wherein the fallback consists of directing customers to a product page, yet sales of the product go up, correction of the fallback errors may be de-emphasized in light of the business' goal of increased product sales.

In some embodiments, in addition to identifying factors leading to CCA escalation and understanding pre- or post-incident details, the system and method may include various other indicators of opportunities for optimization (e.g., conversation outcome, topic categorization, CCA response length, errors, repeated outputs, sentiment analysis, response time, and resistance). Optimization (i.e. making code changes to modify the behavior of the CCA) may enhance the performance of the chat or voiceCCA, influencing its capacity to address user issues and reducing the reliance on human support. Targeting optimization changes based on CCA recommendations can yield long-term benefits for users by improving their interactions with the technology.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

The skilled person will be aware of a range of possible modifications of the various embodiments described herein. Accordingly, the present invention is defined by the claims and their equivalents.

Definitions

"Application Programming Interface" or "API" as used herein means a request by a software application to access data or any other service from another application or any other server. API calls enable communication and data exchange between different software systems often over the Internet, and are used extensively in cloud-based systems, distributed computing systems, and web applications to fetch data, perform operations, and interact with external services.

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video. Earlier AI systems were rule-based, but most current AI systems utilize machine learning algorithms.

"Artificial Intelligence Assistant" or "AI assistant" as used herein means AI-powered tools designed to interact with humans through conversational interfaces, providing information, answering questions, helping with tasks, and engaging in dialogue. These assistants use advanced language models to understand user queries and generate relevant, contextually appropriate responses across a wide range of topics and tasks.

"Computerized conversational agent" or "CCA" (also sometimes known as "dialog agents") as used herein means a class of computer programs designed to have, or at least mimic, conversations with humans in order to obtain information and assist with various activities such as routing to a particular agent, troubleshooting a problem with a product or service, or to provide requested information. Depending on their configuration, CCAs can have conversations via typewritten text, handwritten text, speech, or even gestures such as sign language. The most common types of CCAs are chatCCAs (primarily typed-text-based, such as via a website) and interactive voice response (IVR) systems (primarily voice-based, such as over the telephone), although CCAs can be configured to have conversations using handwritten text and gestures. There are three primary CCA models: rule-based CCAs which use lists of pre-defined rules to process queries and responses, statistically-enhanced CCAs which are primarily rule-based but are enhanced with some predictive language capabilities, and artificial intelligence (AI) based CCAs which use trained neural networks (of which large language models (LLMs) are one type) to process language in a manner mimicking that of the human brain. CCAs generally follow a process of receiving a natural language input (text, audio, or image), converting the input to text, processing the text via rules or AI to understand various aspects of the input (e.g., intent, sentiment, emotion, etc.), determining an appropriate response based on the rules or AI, generating a natural language response in text form, and converting the natural language response text to the original input format.

"Conversational data" as used herein means conversational data generated by a computerized conversational agent interacting with another conversational entity. In most cases, the other conversational entity will be a human, but in some cases such as generation of testing data or training data the other conversational entity may be another computerized conversational agent.

"Large language model" or "LLM" as used herein means a type of artificial intelligence model trained on vast amounts of text data to understand and generate human-like text. These models use deep learning techniques, particularly transformer architectures, to process and predict language. They are """large""" due to their enormous number of parameters (often in the billions) which allow them to capture complex linguistic patterns and generate sophisticated responses. LLMs are a type of neural network, and can be configured as artificial intelligence assistants. Examples include GPT (Generative Pre-trained Transformer) models, BERT, and Claude.ai.

"Machine learning" or "machine learning algorithm" as used herein is an aspect of artificial intelligence in which the computer system or component can modify its behavior or understanding without being explicitly programmed to do so. Machine learning algorithms excel at finding patterns in complex data or exploring the outcomes of large numbers of potential options. There are three primary categories of machine learning algorithms, supervised machine learning algorithms, unsupervised machine learning algorithms, and reinforcement machine learning algorithms. Supervised machine learning algorithms are trained to recognize patterns by training them with labeled training data. For example, a supervised machine learning algorithm may be fed pictures of oranges with the label "orange" and pictures of basketballs with the label basketball. The supervised machine learning algorithm will identify similarities (e.g., orange color, round shape, bumpy surface texture) and differences (e.g., black lines on basketball, regular dot pattern texture on basketball versus random texture on oranges) among the pictures to teach itself how to properly classify unlabeled pictures input after training. An unsupervised machine learning algorithm learns from the data itself by association, clustering, or dimensionality reduction, rather than having been pre-trained to discriminate between labeled input data. Unsupervised machine learning algorithms are ideal for identifying previously-unknown patterns within data. Reinforcement machine learning algorithms learn from repeated iterations of outcomes based on probabilities with successful outcomes being rewarded. Reinforcement machine learning algorithms are ideal for exploring large number of possible outcomes such as possible outcomes from different moves on a chess board.

"Natural language processing" or "NLP" as used herein means a branch of artificial intelligence that focuses on the interaction between computers and human language. NLP enables computers to read, understand, interpret, and generate human language in a way that is both meaningful and useful. It involves various tasks such as language translation, sentiment analysis, text summarization, and speech recognition. Earlier NLP engines were rule-based, but most current NLP engines utilize machine learning algorithms.

"Natural language understanding" or "NLU" as used herein means a subset of NLP that specifically deals with machine comprehension of human language. NLU goes beyond simply processing text by attempting to understand the context, intent, and nuanced meaning behind human communication. It involves extracting meaning, identifying intent, and interpreting the semantic relationships within language.

"Natural language generation" or "NLG" as used herein means a subset of NLP that deals with generation of written or spoken language that sounds natural and human-like. NLG takes structured data or information and transforms it into readable, coherent text. This can range from generating simple sentences to creating complex narratives, reports, or responses. Earlier NLG engines were rule-based, but most current NLP engines utilize machine learning algorithms. "Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

"Term-frequency inverse document frequency" or "TF-IDF" as used herein is a measure of importance of a term (i.e., word), t, to a document, d, in a collection of documents, D, adjusted for the fact that some words appear more frequently in general, wherein "term frequency" is the relative frequency of term t within document d, and inverse document frequency is a measure of the rarity of term t across all documents D (wherein a term that is more rare indicates that it provides more information to the document d).

"User" as used herein means a human person using or interacting with a CCA.

Detailed Description of the Drawing Figures

FIG. 1 is a block diagram illustrating an exemplary system architecture for an automated conversational analysis system for computerized conversational agents. The automated conversational analysis system 100 of this embodiment comprises a system configuration manager 200, a data ingestion engine 300, and four analysis modules 110: a conversation indicator extractor 400, a fallback analyzer 500, a topic modeling engine 600, and a CCA score generator 700. In some embodiments, the system may further comprise cloud-storage 130, a database search engine 120, and a CCA update engine 150.

The system configuration manager 200 allows administrators to specify a CCA 160 to be analyzed and configurations for the CCA 160, set objectives for analysis such as testing parameters and business objectives, and select features of the CCA 160 to be analyzed.

The data ingestion engine 300 inputs conversational data and other data from the specified CCA 160 either via API calls or manual uploads, normalizes the data for processing by parsing the conversations and restructuring the data into a standardized format, and redacts personally identifiable information (PII), and stores the normalized data in cloud-based data storage for analysis. Data normalization may include basic quantitative analyses about the data such as the number of messages in each conversation, message lengths, counts of errors generated during a conversation, and/or other such metadata about the data itself.

The four analysis engines 110 perform automated conversational analysis and scoring of CCAs. The conversation indicator extractor 400 applies a variety of processors (which, in some embodiments, may be cloud-based microservices accessible via API calls) to the normalized data to extract indicators of the quality of the specified CCA's 160 performance. The fallback analyzer 500 similarly applies a fallback type discrimination algorithm to the normalized data to determine whether fallback errors are due to the CCA's failure to understand the user's intent or due to the user's provision of a response that does not coincide with the CCA's prompt. This classification provides additional information as to the quality of the CCA's 160 performance. The topic modeling engine 600 uses a combined natural language processing (NLP) topic generator combined with a topic smoothing engine to determine what types of issues the CCA is encountering on a regular basis (e.g., over a 7-day window) to identify trends in quality of performance of the CCA 160 by conversational topics. To retrieve data for their analyses, the analysis engines 110 may use a database search engine 120 to search for, and retrieve, relevant data from the normalized data stored in the cloud-based data storage 130. In some embodiments, the cloud-based data storage 130 may instead be storage on local computers or networks.

Based on the conversational analyses by the analysis modules, the system produces CCA analysis results, which may take the form of charts, graphs, tables, text descriptions, scores, and other means of relaying to an administrator the quality of performance of the CCA 160 under analysis. In some embodiments, these analyses may be fed to a CCA update engine 150 which is configured to automatically adjust a CCA to correct conversational quality problems by, for example, re-writing conversational rules for rule-based CCAs or by retraining a conversational AI CCA using labeled conversation training data containing corrections.

In some embodiments, some or all of the system accesses cloud-based resources and/or microservices such as cloud-based data storage and databases, search engines, cloud-based neural networks (including but not limited to Large Language Models (LLMs)), cloud-based generative artificial intelligence (GAI) services, spell-checking microservices, mathematical calculation microservices, and the like.

Figure 2:
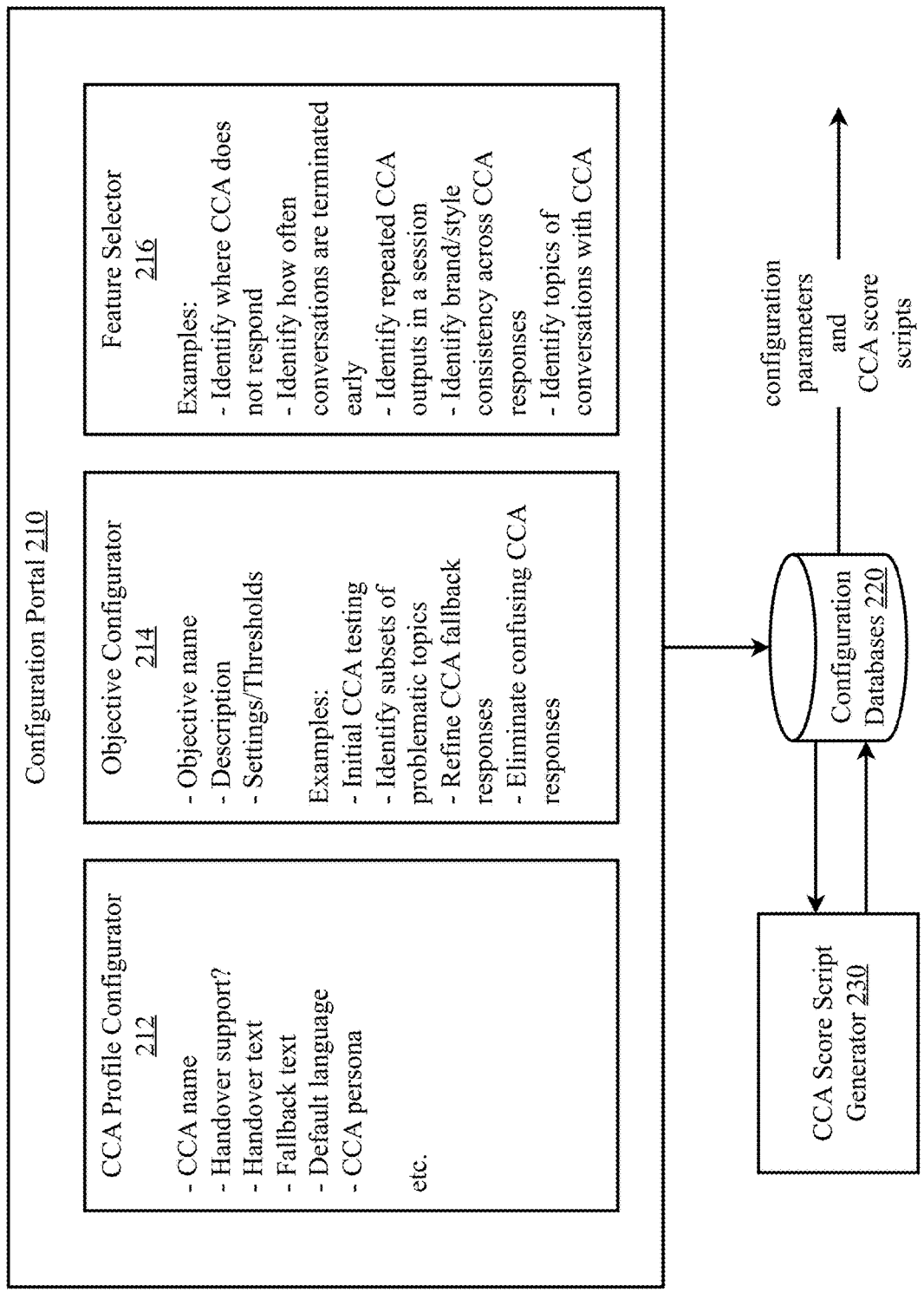
FIG. 2 is a block diagram illustrating an exemplary system architecture for a system configuration manager aspect of an automated conversational analysis system for computerized conversational agents.

FIG. 2 is a block diagram illustrating an exemplary system architecture for a system configuration manager aspect of an automated conversational analysis system for computerized conversational agents. The system configuration manager 200 allows administrators to specify a CCA 160 to be analyzed and configurations for the CCA 160, set objectives for analysis such as testing parameters, testing objectives, and business objectives, and select features of the CCA 160 to be analyzed. The system configuration manager 200 of this embodiment comprises a configuration portal 210, one or more configuration databases 220, and a CCA score script generator 230.

The configuration portal 210 of this embodiment comprises a CCA profile configurator 212, an objective configurator 214, and a feature selector 216.

The CCA profile configurator 212 allows administrators to select a CCA for analysis, and to provide identification, location, and access information for the CCA (e.g., URLs and passwords for access to the CCA via API calls, etc.), as well as establish configurations and settings to be used in the analysis (CCA name, handover support information, fallback text information, default language information, and whether the CCA has one or more "personas" associated with it which may use different dialects or speech patterns, etc.).

The objective configurator 214 allows administrators to set objectives for analysis such as testing parameters and thresholds and to set objectives for the testing. Non-limiting examples of testing objectives may include initial CCA testing for newly-installed CCAs, identification of subsets of problematic topics for further analysis, correction and refinement of fallback responses, and elimination of confusing responses. The objective configurator may further allow administrators to enter business-related thresholds, key performance indicators (KPIs), and/or business objectives for inclusion in the analysis. For example, a business may enter thresholds or key performance indicators (KPIs) for escalations to agents, fallback percentages, abandonments of calls by clients, etc. If the CCA performs above positive thresholds (e.g., 98% of calls are successfully handled by the CCA without escalation to an agent), then recommendations for correcting certain CCA quality issues may be deemphasized or ignored. Conversely, if the CCA performs below negative thresholds (e.g., only 25% of calls are successfully handled by the CCA without escalation to an agent), then recommendations for correcting certain CCA quality issues may be emphasized or warnings and notifications may be sent to administrators for urgent action.

Setting objectives allows administrators to conduct goal-oriented data segmentation. Specific insights can be derived by analyzing sub-sets of conversations that meet certain criteria. For example, an administrator can configure an objective that analyses conversations associated with a particular topic, or those that were escalated to human agents. Furthermore, data from objective-based analyses may be stored to allow for tracking the effectiveness of improvements and changes associated with given objectives.

The feature selector 216 allows administrators to select features of the CCA for analysis. A non-limiting list of examples of such features includes identifying where the CCA does not respond-identifying how often conversations are terminated early, identifying repeated CCA outputs in a session, identifying brand/style consistency across CCA responses, and identifying topics of conversations with the CCA or topics of conversations where the outcome has a particular result (whether positive or negative).

The configuration database 220 stores the set of configuration parameters (configurations, settings, objectives, and selections) entered by the administrator for use during automated analysis of conversational data produced by the CCA. A CCA score script generator 230 may be used to generate scripts that combine the configurations, settings, objectives, and selections into a set of data processing rules that may be used to generate summaries and scoring for the various conversational analyses performed by the analysis engines 110. The configuration parameters are forwarded to the data ingestion engine 300 and the CCA score scripts are forwarded to the CCA score generator 700.

Figure 3:
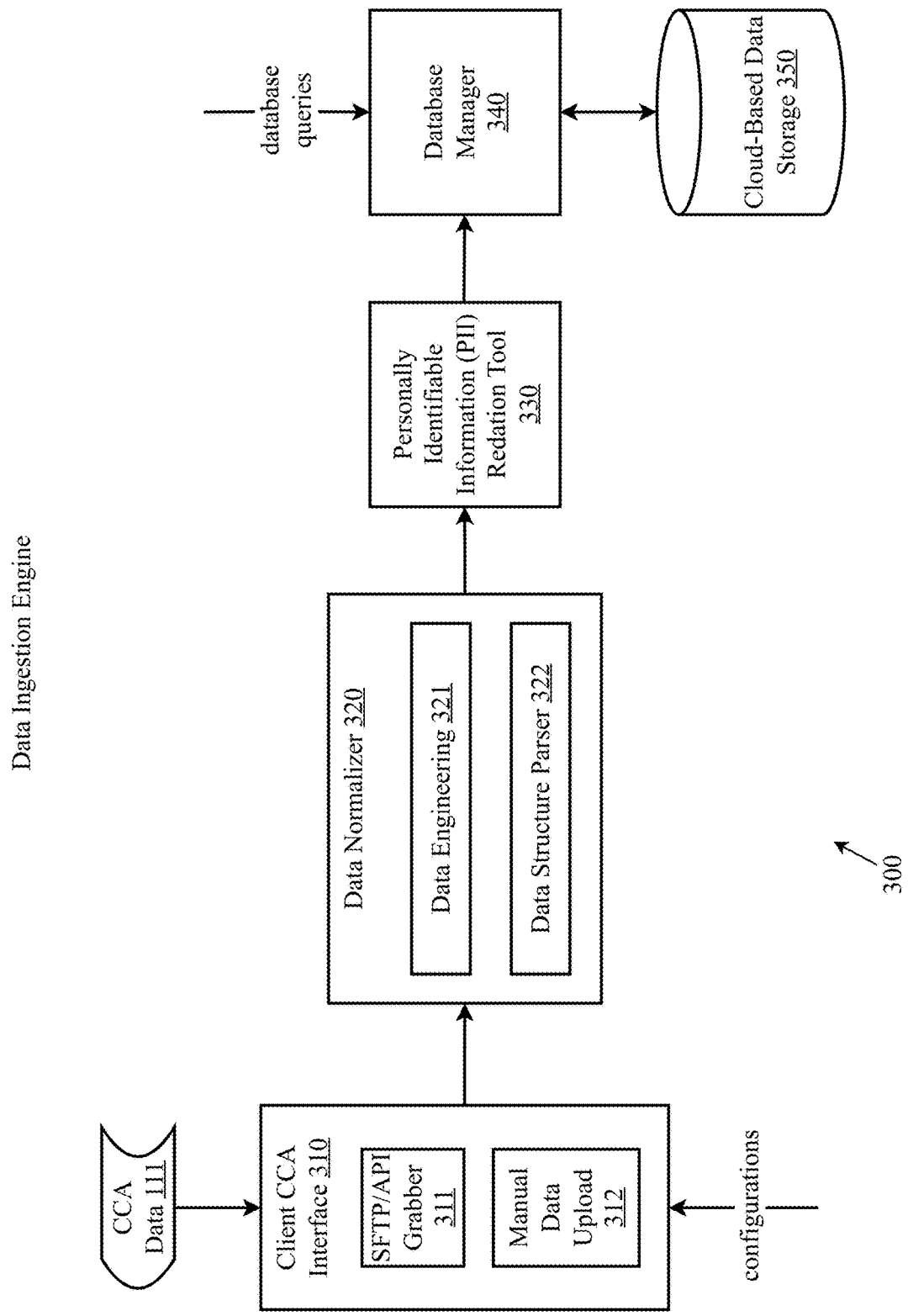
FIG. 3 is a block diagram illustrating an exemplary system architecture for a data ingestion engine aspect of an automated conversational analysis system for computerized conversational agents.

FIG. 3 is a block diagram illustrating an exemplary system architecture for a data ingestion engine aspect of an automated conversational analysis system for computerized conversational agents. The data ingestion engine 300 of this embodiment comprises a client CCA interface 310, a data normalizer 320, and a personally-identifiable information (PII) redaction tool 330.

The client CCA interface 310 receives the configurations comprising a specified CCA 160, and retrieves CCA data 111 from the specified CCA 160 either via API calls 311 or through manual downloads by an administrator using a manual user interface 312. The CCA data comprises conversations between the CCA and a user derived from CCA data. In some embodiments, for example, in the case of text chats, chatbots, or text messaging, the CCA data may already be in text form, in which case the CCA data is also a transcript. In other cases, the CCA may be in the form of audio, images, or video, in which case a transcript may need to be generated. In the case of audio-only phone calls or voice-over-Internet-protocol (VOIP) calls, the transcript may be generated using automated speech recognition (ASR) processor (a type of NLU processor). In the case of image-based or gesture-based CCAs (e.g., for users communicating via sign language), the transcript may be generated via image-to-text or video-to-text processors. The data retrieval may be either manual or automatic depending on the configurations.

The data normalizer 320 of this embodiment parses the transcript into one or more conversations, the conversations comprising one or more messages between the CCA and the user, with messages in the conversations attributed by the data normalizer as being from the CCA or from the user. The output of the data normalizer is transcript data comprising structured data about the conversations, their messages, and metadata about the messages (such as labels for whether the message was generated (i.e., authored) by the CCA or by the user). The data normalizer 320 receives the transcript and processes it through a data engineering phase 321 and a data structure parsing phase 322. The data engineering phase 321 comprises a process of data cleaning (removing duplicates, handling missing values, correcting inconsistencies), data transformation (converting data into consistent formats, units, and scales, and data validation (checking data quality and integrity). The data structure parsing phase 322 comprises schema definition (creating a standardized data model), data type mapping (ensuring consistent data types across the dataset), validation (verifying data conforms to defined schemas), and format conversion (converting between different data formats such as JSON, XML, CSV, etc.). Data normalization provides a consistent dataset for analysis by maintaining data consistency across all sources, handling edge cases and unexpected data formats, implementing proper error logging and monitoring, ensuring scalability of the normalization process, and ensuring compliance with transformation rules and data mappings.

The personally-identifiable information (PII) redaction tool 330 uses rules and databases to redact personally-identifiable information such as names, addresses, birthdays, etc., and may be a cloud-based service or microservice that provides PII redaction services.

Figure 4:
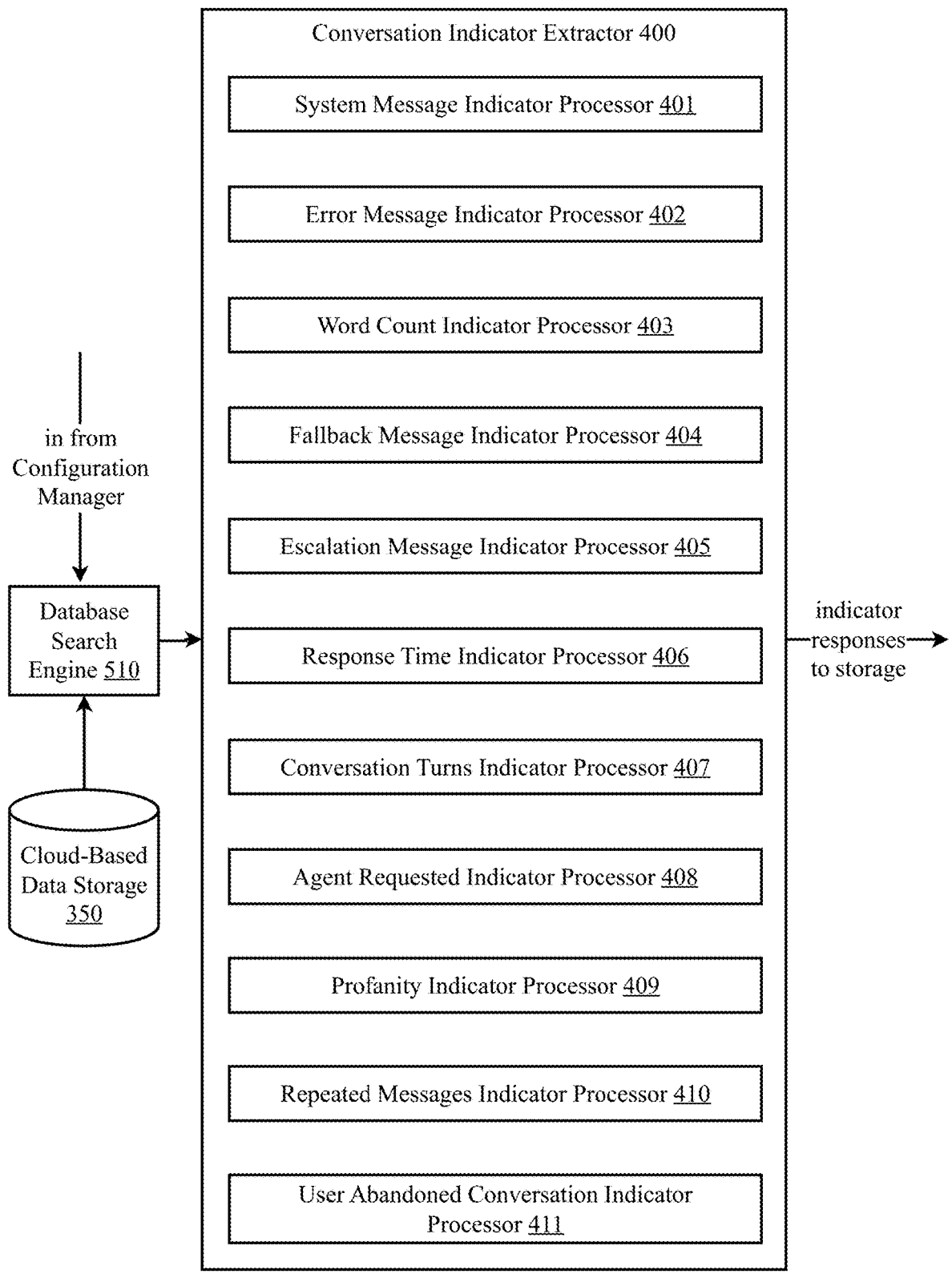
FIG. 4 is a block diagram illustrating an exemplary system architecture for a conversation indicator extractor aspect of an automated conversational analysis system for computerized conversational agents.

FIG. 4 is a block diagram illustrating an exemplary system architecture for a conversation indicator extractor aspect of an automated conversational analysis system for computerized conversational agents.

The conversation indicator extractor 400 of this embodiment is responsible for ingesting a conversation from the chat transcript provided by the administrator and creating indicator information from the data. The conversation indicator extractor 400 processes the conversation data through one or more indicator processors. In this embodiment, the indicator processors are cloud-based services or microservices accessed via API calls, but in other embodiments the processors may be on local computers or networks. Each process method is called with the conversation context and the ingestion pipeline payload. A deep copy of the payload is created to ensure the original data remains unaltered during processing.

The indicator evaluations are performed iteratively. Each indicator processor is executed in sequence. The processor analyzes the payload and returns an indicator response, which indicates success or failure. If processing is successful, the processed payload may be updated; if not, an error is logged, and the process may either continue or halt depending on the recoverability of the error. Once all indicator processors have completed their evaluations, a final payload processor response is generated, indicating overall success or failure and providing the processed payload. The final response is then used to update the cloud-based data storage 130, ensuring that the analysis and metrics are stored for future retrieval, monitoring, and reporting.

A system message indicator processor 401 evaluates and processes system-generated messages within the conversation. In this embodiment, the system message indicator processor performs the following operations. The processor retrieves and reviews an expected payload setting from the stored configurations created by the administrator. The expected payload setting comprises a list of predefined system messages expected to be in the conversations. The processor checks to see whether these messages exist and processes them as system messages. For each expected system message, the processor creates a lowercase version of the messages to ensure comparisons are case insensitive. It then iterates through each message in the conversation to identify those authored by the CCA or user that match any expected system messages. When a match is found, the processor updates the message's author to indicate that the message is a system message. If the message doesn't have any existing indicators, it initializes a new indicators object with the corresponding system message ID. It also updates the conversation's indicators to include this system message ID, ensuring it is captured for further analysis. After processing, the system returns an indicator response, confirming the success of the operation and containing the updated payload reflecting the changes made to the conversation messages and indicators.

An error message indicator processor 402 detects and processes errors in CCA responses to identify failures in the conversation flow. In this embodiment, the error message indicator performs the following operations. The processor first checks the expected messages from the payload to extract the relevant error messages. If error messages are defined, it prepares to process them; otherwise, it returns "none." The processor iterates through each message in the conversation. For each message authored by the CCA, it converts the message text to lowercase for case-insensitive comparison. It checks if the message contains any of the expected CCA error messages. If a match is found and the message does not already have an error message ID, the processor updates the message's indicators to include this ID. If the conversation's indicators do not exist, it initializes them and adds the error message ID to the conversation's metadata, maintaining a record of all error messages encountered. The processor concludes by returning an expected message indicator response, indicating the successful processing of the message and containing the updated message reflecting the new indicators.

A word count indicator processor 403 analyzes the total word count of messages in the conversation to gauge verbosity or conciseness. In this embodiment, the word count indicator processor performs the following operations. The processor iterates through each message in the conversation payload, specifically focusing on messages authored by the CCA. For each CCA message, the processor calculates the total number of words by splitting the message text and counting the resulting elements. If the message does not already have indicators, the processor initializes a new indicators object and sets the word count to the calculated value. If indicators already exist, it simply updates the word count field with the new value. Finally, the processor returns an indicator response, indicating successful processing and containing the updated payload with the new word count indicators included in the CCA messages.

A fallback message indicator 404 processor monitors occurrences of fallback messages to understand when the CCA cannot provide a satisfactory response. In this embodiment, the fallback message indicator processor performs the following operations. The processor first retrieves the list of expected fallback messages from the expected messages object. The process message method examines each CCA message in the conversation to convert the CCA message to lowercase for case-insensitive comparison and check whether the CCA is the author of the message and if the message contains a fallback keyword. If a fallback message is found, the processor looks for the preceding user message and the initial CCA message that generated the user's response. It reverses through the conversation messages until it finds the user response followed by the last CCA message, establishing context for fallback processing. The processor then invokes a fallback type discriminator service (described in detail later herein) to determine the nature of the fallback (e.g., the fallback message type). This step assesses the interaction between the initial CCA message, the user's response, and the current CCA message to classify the fallback type. If indicators do not exist, the processor creates a new indicators object, setting the fallback message ID, fallback type, trigger message, and trigger message ID. If indicators are already present, it updates the respective fields with the new values. The processor checks if conversation indicators exist; if not, it initializes a new conversation indicators object. It appends the fallback message ID and fallback type to their respective lists if they are not already present. Finally, the processor returns an expected message indicator response, indicating successful processing and containing the updated message with fallback indicators.

An escalation message indicator processor 405 identifies messages indicating escalation requests to human agents. In this embodiment, the escalation message indicator processor performs the following operations. The processor starts by retrieving the expected escalation messages from the provided expected messages object. Each message from the conversation is converted to lowercase to enable case-insensitive comparisons. The processor checks if the message is authored by the CCA and contains the expected escalation message. If the conditions for an escalation message are met and no existing indicators are found, the processor creates a new indicators object, setting the escalation message ID to the ID of the expected message. If indicators already exist, it updates the escalation message ID to reflect the new expected message. The processor then checks whether conversation-level indicators exist. If they do not exist, it initializes a new conversation indicators object, appending the escalation message ID to the list. If conversation indicators are present, it checks if the escalation message ID is already in the list. If not, it appends the ID to ensure a cumulative record of escalation messages. Finally, the processor generates an expected message indicator response, indicating successful processing and returning the updated message that now includes the escalation indicators.

A response time indicator processor 406 measures the response time of the CCA to assess responsiveness and user experience. In this embodiment, the response time indicator processor performs the following operations. The processor iterates through each message in the conversation transcript, focusing on messages authored by the CCA or system to gather response time data. For each message, it checks the timestamp of the previous message to calculate the response time. If the current message is the first in the conversation, the response time is set to zero. Otherwise, the processor computes the time difference in milliseconds between the current message's timestamp and that of the previous message. If the message does not have existing indicators, a new indicators object is created to store the calculated response time. If indicators are already present, the processor updates the response TimeInMilliseconds property with the newly calculated value. When the message is authored by the CCA, the processor checks for the existence of conversation-level indicators. If none exist, it initializes a new conversation indicators object to record the CCA's response times. If conversation indicators are present, it appends the new response time to the list, ensuring it is unique to avoid duplication. Finally, the processor returns an indicator response, indicating the operation was successful and including the modified payload that reflects all updates made to the conversation messages and indicators.

A conversation turns indicator processor 407 counts the number of turns in the conversation to evaluate engagement levels. In this embodiment, the conversation turns indicator processor performs the following operations. The processor begins by initializing a counter (turns) to zero, which will be used to track the number of turns taken in the conversation. It iterates through each message in conversation messages payload. During this iteration, the processor checks the author of each message. For each message authored by anyone other than the system (i.e., user or CCA), the processor increments the turns counter by one. This step effectively counts the total number of turns in the conversation, excluding system messages. After counting the turns, the processor checks if the conversation indicators attribute in the payload exists. If it does not exist, a new conversation indicators object is created with the current turns count. If it already exists, the processor updates the turns property of the existing indicators with the new count. Finally, the processor returns an indicator response, confirming the successful processing of the operation and containing the updated payload, which reflects the changes made to the conversation indicators.

An agent requested indicator processor 408 detects requests from users for human agent intervention within the conversation. In this embodiment, the agent requested indicator processor performs the following operations. The system examines each user message in the conversation payload to identify those authored by the user. Only user messages are processed, ensuring that agent request detection is focused solely on the user's intent. For each user message, the system splits the message text into individual sentences; strips punctuation from words (except for specific redacted entities denoted by double brackets, e.g., [[entity]]), allowing for accurate keyword matching; checks each word and phrase against a pre-defined list of agent request keywords, including terms such as "agent," "human," or "representative," and phrases like "speak to someone"; If a keyword or phrase indicating an agent request is found, the system flags that message as containing an agent request. When a user message is flagged as an agent request: a. The system updates an "isAgentRequested" indicator on the message, marking it for agent escalation. b. The system increments an "agentRequestedCount" field in the conversation metadata, maintaining a cumulative count of agent requests throughout the conversation.

The profanity indicator processor 409 identifies and flags the use of profanity in user messages to ensure compliance with standards and to identify issues of frustration, anger, and emphasis by the user. In this embodiment, the profanity indicator processor performs the following operations. The system examines each message in the conversation, specifically focusing on those authored by the user. Each user message is parsed into individual sentences. This step enables more accurate detection of profanity, as it allows for the analysis of context within each sentence. Before detecting profanity, the processor verifies the configured settings, specifically the confidence threshold established by the administrator. This threshold ensures that only sentences with a probability of containing profanity exceeding this benchmark are flagged, minimizing false positives. To refine the analysis, the processor identifies and applies a list of stop words specified by the administrator in the system settings. These excluded words are replaced with a neutral placeholder, preventing them from skewing the detection results. The processor evaluates the likelihood that each sentence contains profanity, calculating a probability score based on linguistic patterns. It compares this score against the previously validated confidence threshold to determine whether to indicate the presence of profanity. When profanity is detected, the system updates the message indicators accordingly. This includes flagging the message to indicate the presence of profanity, which enables further handling or reporting of inappropriate content. The processor also maintains a cumulative count of messages flagged for profanity throughout the conversation. This metric helps in assessing the overall tone and appropriateness of user interactions. Finally, the processor consolidates all findings and updates into a comprehensive response. This response confirms the success of the processing operation and reflects the updated state of the conversation, ensuring that all relevant indicators and metrics are available for subsequent analysis or action.

The repeated messages indicator processor 410 monitors for repeated messages within the conversation to identify potential user frustration or issues. In this embodiment, the repeated messages indicator performs the following operations. The processor begins by creating two lists to track discovered sentences from both the CCA and the user during the conversation. It iterates through each message in the conversation, focusing on those authored by either the CCA or the user. For each message, the processor breaks down the content into individual sentences. This granular approach facilitates a more precise assessment of sentence repetition. Each sentence is converted to lowercase to enable consistent comparisons. The processor then checks whether the sentence has been previously seen based on the author's type (CCA or user). It uses a helper method to determine if the sentence qualifies as a repeated message, which considers a minimum word count configured by the administrator. If a sentence is identified as a repeat, it is added to a list of repeated messages. The processor keeps track of these repeated messages for further analysis. After processing all sentences in a message, the processor updates the message's indicators. If repeated messages are found, it records them along with a count of how many times they occurred. The processor updates the overall conversation indicators to reflect the count of repeated messages for both the CCA and the user. This information is vital for understanding conversation dynamics and user interactions. Finally, the processor returns an indicator response, indicating the success of the operation and containing the updated payload. This payload includes all modifications made to the conversation messages and indicators, ensuring that the data is ready for subsequent processing or analysis.

The user abandoned conversation processor 411 detects when users abandon conversations to analyze dropout rates and improve retention strategies. In this embodiment, the repeated messages indicator performs the following operations to determine whether either the user or the CCA has abandoned the conversation. The processor retrieves the settings related to acceptable CCA questions from the configuration and initializes an empty list for case-insensitive accepted questions. Acceptable CCA questions are excluded from the abandonment assessment. For example, if the CCA asks the user to complete a survey, or if the user needs help with anything else, a lack of a user response to these questions is not considered to indicate abandonment. The processor iterates through each message in the conversation, assessing the author of each message (either the CCA or the user) and taking appropriate actions based on the message content. For messages authored by the CCA, the processor checks if the message qualifies as an accepted question. If the message is recognized as an acceptable question, it continues to the next message without further evaluation. If the message is not an accepted question, the processor splits the message into sentences and determines whether any sentence is structured as a question. The pseudocode in FIG. 9 and its associated text describes the logic that assesses if each sentence contains a question.

Messages from users that are empty are ignored, as are messages from the system. The focus remains on interactions between the user and the CCA. The processor tracks whether the last message from the CCA was a question, maintaining a flag to indicate this state. User abandonment is identified if the last message was from the CCA and that message was a question. This suggests that the user may have left the conversation without responding. To detect CCA abandonment, the processor checks if the last message from the user was a question. If the CCA did not follow up with an appropriate response or a relevant question, it indicates that the CCA may have abandoned the conversation. This check ensures that the processor identifies instances where the CCA fails to engage effectively after a user's inquiry. After completing the analysis, the processor updates the conversation indicators to reflect the abandonment status for both the user and the CCA. If the conditions for user abandonment are met, an indicator is set to denote this situation. Similarly, if the CCA abandonment conditions are satisfied, a distinct indicator is activated for the CCA. The processor returns an indicator response indicating the success of the operation and contains the updated payload, which now includes indicators for both user and CCA abandonment, if applicable.

Figure 5:
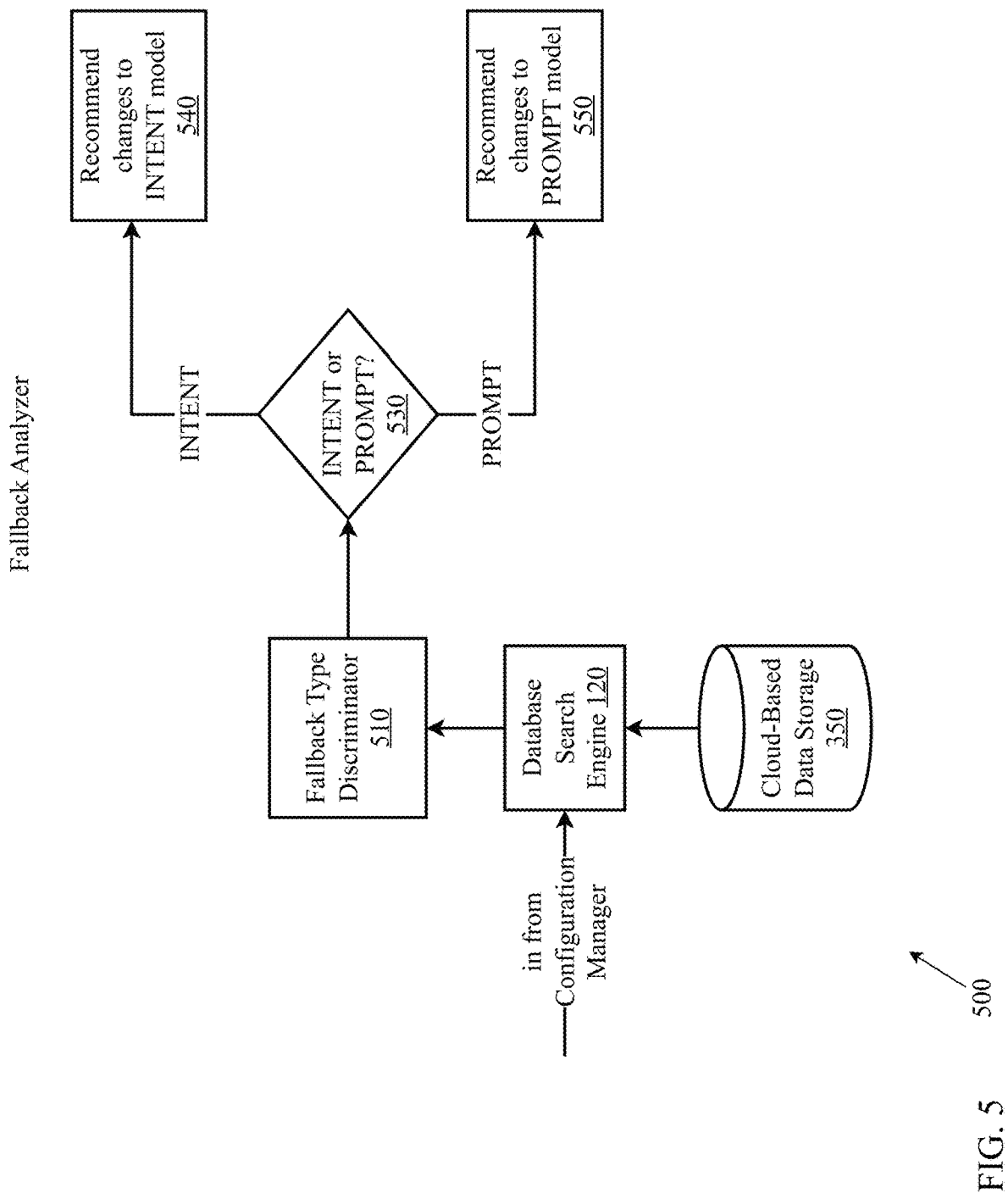
FIG. 5 is a block diagram illustrating an exemplary system architecture for a fallback analyzer aspect of an automated conversational analysis system for computerized conversational agents.

FIG. 5 is a block diagram illustrating an exemplary system architecture for a fallback analyzer aspect of an automated conversational analysis system for computerized conversational agents. The fallback analyzer 500 similarly applies a fallback type discrimination algorithm to the normalized data to determine whether fallback errors are due to the CCA's failure to understand the user's intent or due to the user's provision of a response that does not coincide with the CCA's prompt.

Most dialogue management systems are finite state machines wherein a recognized user intent typically triggers a specific action, for example, prompting the user for a specific piece of information. This means that most conversations start with an open-ended question, with the scope narrowing throughout the course of the conversation, typically following a decision tree triggered by the user's response to that first open-ended question. Consequently, when a fallback event occurs, identifying the root cause of the failure can provide valuable information for conversational analysis. There are typically two primary causes of fallback events: intent-based wherein the CCA fails to understand the user's intent, or prompt-based wherein the user provides a response that does not coincide with the CCA's prompt. Distinguishing between the two root causes is important because these two NLP components work very differently and may require very different fixes to correct CCA operation. Intent is typically determined by machine learning algorithms trained for natural language understanding. Prompts are typically rule based. So, for example, correction of intent-related fallbacks may require changes to the underlying intent model of a machine learning classifier-driven intent recognition system or other fixes associated with improperly functioning machine learning algorithms. Correction of prompt-related fallbacks may require correction of NLP rules at certain points of a rule-based decision tree, or possibly that the conversation design be improved to reduce the likelihood of the user providing an unexpected response.

Figure 10:
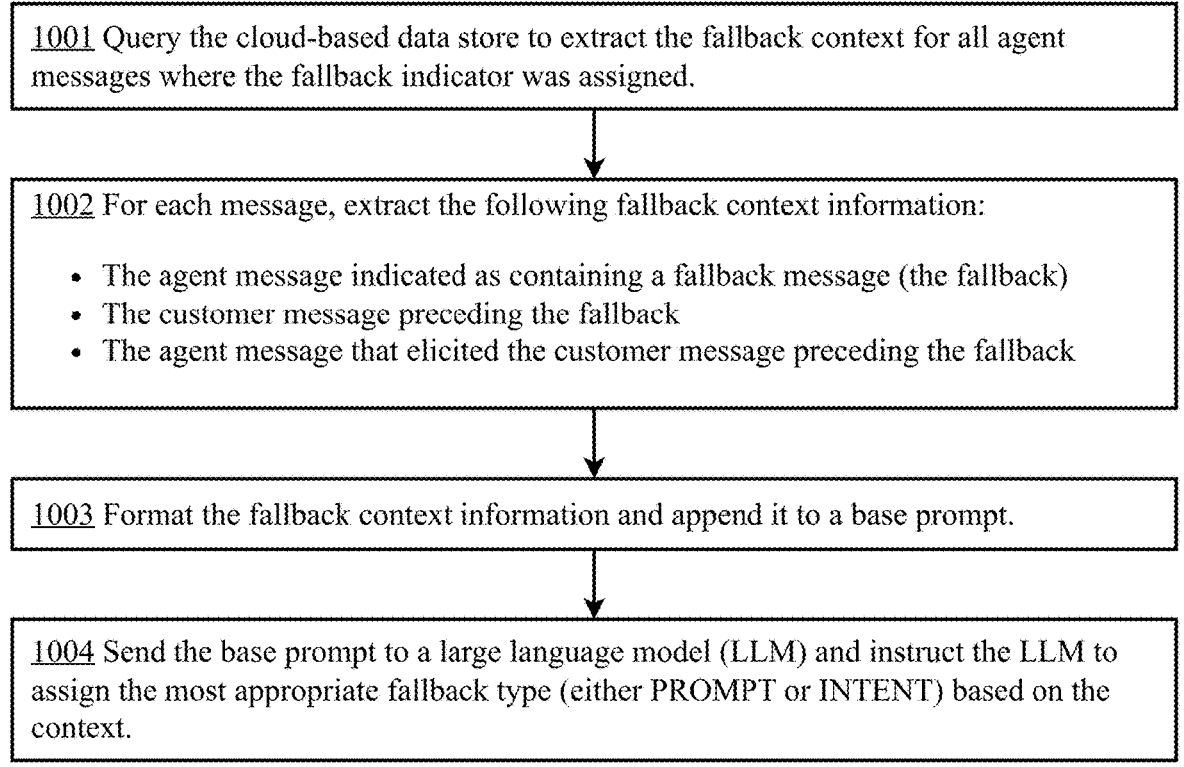
FIG. 10 is a flow diagram illustrating an exemplary algorithm for fallback type discrimination for automated analysis of computerized conversational agent conversational data.

The fallback type analyzer of this embodiment uses the algorithm of FIG. 10 and its associated text to determine 530 whether the fallback error was caused by a failure of the CCA to recognize the intent of the user or caused by the user's provision of a response that does not coincide with the CCA's prompt. In a first step, the fallback discriminator uses a database search engine 120 to search for and retrieve conversations from a cloud-based data store 130 wherein a fallback error has occurred. The database search engine 120 may be of any suitable type, but in this embodiment is a cloud-based service such as Elasticsearch. Following retrieval of the relevant conversations, the fallback discriminator 510 extracts the fallback context for all CCA messages where a fallback indicator was assigned. In this embodiment, the fallback context extracted comprises the agent message indicated as containing a fallback message (the fallback), the customer message preceding the fallback, and the agent message that elicited the customer message preceding the fallback. FIG. 10 and its associated text provides more detail regarding an exemplary algorithm for fallback type discrimination. The fallback context is formatted and appended to a base prompt, which instructs a large language model (LLM) to assign the most appropriate fallback type based on the context. The pseudocode in FIG. 11 and its associated text provides exemplary instructions that may be given to an LLM to perform the fallback type discrimination.

Using the above-described algorithm, the fallback type discriminator 510 determines 530 whether the fallback error was caused by a failure of the CCA to recognize the intent of the user or caused by a failure of the CCA's prompt to the user. If the fallback type discriminator 510 determines the fallback was caused by a failure of the CCA to recognize the intent of the user, it may recommend changes to the CCA's intent model 540 based on the failure. If the fallback type discriminator 510 determines the fallback was caused by a failure of the CCA's prompt to the user (e.g., an unclear or ambiguous prompt), it may recommend changes to the CCA's prompt model 550 based on the failure.

Figure 6:
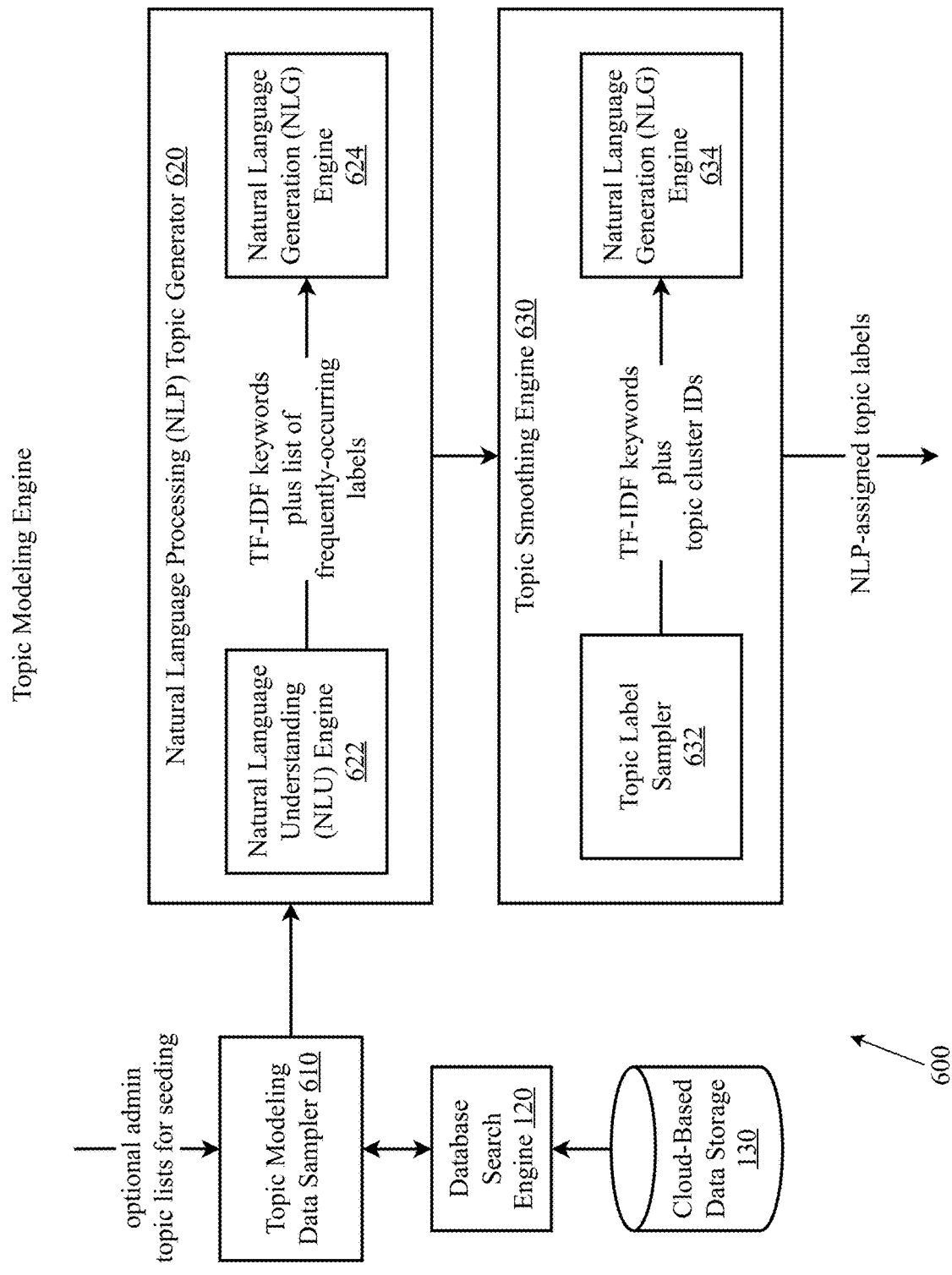
FIG. 6 is a block diagram illustrating an exemplary system architecture for a topic modeling engine aspect of an automated conversational analysis system for computerized conversational agents.

FIG. 6 is a block diagram illustrating an exemplary system architecture for a topic modeling engine aspect of an automated conversational analysis system for computerized conversational agents. The topic modeling engine of this embodiment leverages unsupervised topic modeling on customer messages by combining a natural language understanding (NLU) engine with a natural language generation (NLG) engine to help surface trends in the data, allowing the CCA admin to, for example, analyze how trending topics change over time, or identify salient patterns in the user messages that triggered agent fallback responses. Machine-learning-based NLUs and NLGs are both large language models (LLMs), but are trained for different purposes. Machine-learning-based NLUs (e.g., Google's open-source Bidirectional Encoder Representations from Transformers (the LLM)) are trained to understand natural language, but their outputs are not easily understood by humans (i.e., they are not natural language outputs). Machine-learning-based NLGs (e.g., ChatGPT, OpenGPT, etc.) on the other hand, are trained to produce natural language outputs, but do not excel at natural language understanding in the way that NLUs do.

Topic modeling for conversational analysis poses several challenges. First, there must be a large enough dataset to ensure a meaningful and representative topic distribution for each topic modeling run. Second, while the CCA administrator may provide a list of topics likely to occur in the data (i.e., seeded topics) the administrator is highly unlikely to be able to provide a comprehensive list of such topics. Therefore, a means is needed to expose naturally occurring trends in the data not currently defined in the business logic of the system or provided by the administrator. (i.e., surfacing of unknown topics). Third, maintaining consistency of topic labels between runs is important to maintain consistency of results. If similar topics are labeled differently between runs, trends in topics will be harder to identify. For example, if Run A assigns topic label "Activation" to certain types of conversations and Run B assigns topic label "Activate" to the same or similar conversations, then what should be a topical trend might be missed. Maintaining consistency is particularly important when dealing with longer term trends in the data.

The exemplary topic modeling engine described herein is designed to solve the problems described above. The topic modeling engine of this embodiment comprises a topic modeling data sampler 610, a natural language processing (NLP) topic generator 620 and a topic smoothing engine 630.

The topic modeling data sampler 610 uses a database search engine 120 to search for and retrieve conversations from a cloud-based data store 130. The database search engine 120 may be of any suitable type, but in this embodiment is a cloud-based service such as Elasticsearch. The topic modeling data sampler 610 of this embodiment samples the data according to a sampling time window which is chosen to be large enough to ensure a meaningful and representative topic distribution. If topics are to be modeled for a time period too short to ensure meaningful and representative topic distribution (e.g., topics are to be modeled for the past hour or the past day), the sampling time window is enlarged to include sufficient data surrounding that time period to ensure a meaningful and representative topic distribution. The sampling time window may be fixed, rolling, or dynamically adjusted. In this embodiment, the sampling time window is a rolling seven-day window. That is to say, for each day's worth of data that is ingested into the system, seven days of data are supplied to the LLM for topic modeling (i.e., data from the current day and from the prior six days). Only the topic labels generated for the current day's data will be updated in the data store, but the topic labels will be meaningful and representative because of the inclusion of the prior six days of data during the analysis. In addition to updating the topic labels, the system will store in the data store any messages that were not assigned to a topic cluster in a previous run (i.e., those that were labeled as "unclassified" in previous runs, but now have been classified).

Additionally, the CCA administrator may provide a list of topics in the settings configurations that are likely to occur in the data. This list may be provided as a set of key value pairs where the key corresponds to the desired topic label (e.g. "activation") and the values are a list of keyword strings the CCA admin wishes to be associated with that topic (e.g. "activate," "activation," "activate product"). This list of lists is provided to the LLM when initializing the model parameters. Seeding (also called "guided topic modeling") is a supported feature in some currently-available LLMs (e.g., BERT). Seeded topic modeling introduces a bias into the clustering algorithm that gives preferential treatment to the topic list specified at initialization but does not guarantee these topics will be assigned if they do not occur naturally in the data.

The natural language processing (NLP) topic generator 620 of this embodiment generates topics from conversational data using a two-stage process which leverages the differences in operation and performance of NLUs (e.g., LLMs trained for natural language understanding) and NLGs (e.g., LLMs trained for natural language generation). As NLUs and NLGs operate differently, a method is needed to optimize their strengths to generate valid and consistent topics from conversation.

First, the NLP topic generator 620 uses a natural language understanding (NLU) engine 622 to understand the topics being discussed in each conversation and generate a list of frequently-occurring topic labels in the form of term-frequency inverse document frequency (TF-IDF) lists. NLUs can comprehend language, but their outputs are in the form of TF-IDF derived keywords which are difficult for humans to understand (i.e., they are not natural language topics that a human would easily recognize). As an example, the NLU topic representation for a cluster containing documents that generally relate to the term "activation" may be something like activates_activating_cant_issues_activation. Thus, a means is needed to convert the TF-IDF derived keywords into human-readable topics.

In this embodiment, NLU engine also generates topic cluster identifiers (IDs), which are classifications of groups of terms in the TF-IDF lists. As an example, a setting in the BERT engine allows BERTopic to output clusters of TF-IDF terms together with a keyword representation for each topic cluster (e.g. 01_Acivation_Activate_Products_Activating). A post-processing step is used in this embodiment to separate the topic clusters from their associated TF-IDF terms. Note that, in this embodiment, topic cluster IDs are generated by the NLU for each run and are not necessarily consistent across runs. Therefore, at this step, topic cluster IDs stored and retrieved are those associated with the seeded topics for their respective runs. The seeded topics and their topic cluster IDs for that run are combined into a list of guided topic labels. In other embodiments, topic cluster IDs may be consistent across runs.

In some embodiments, the system may be configured to process topics shorter than 3 tokens in length based on keyword matching and frequency. For such topic labels, new indices may be generated by taking the latest topic index and adding 1 (e.g., BERTopic index+1), thus obtaining the length of the current topic BERTopic index and continuing that index range.

The NLU engine 622 may optionally be provided a labeled list of topics (e.g., key value pairs where the key corresponds to the desired topic label and the values are a list of keyword strings the administrator wishes to be associated with that topic) from an administrator as seed material for guided topic modeling, or from an existing list of topics in the data store, or both.

Second, the NLP topic generator 620 uses a natural language generation (NLG) engine 622 to generate human-readable topics from a combination of the TF-IDF derived keywords, seeded labels, and any existing labels in the data store. Thus, in this embodiment, the TF-IDF derived keywords, seeded labels provided by the administrator, and any frequently-occurring labels in the data store are provided to the NLG engine 624 to generate (or infer) human-readable labels for display to the administrator. To ensure consistency in topics generated by the NLG (topic smoothing), the prompt provided to the NLG may include instructions to use an existing seeded or previously assigned label where appropriate. This topic smoothing process is explained in further detail below.

The topic smoothing engine 630 of this embodiment ensures consistency in topics generated by the NLG using a two-stage process as follows. First, a topic label sampler 632 samples the top n most frequently occurring topics in the data store, where n is configurable by the CCA administrator. Second, the seeded topics, top n labels, and the TF-IDF derived keywords indexed by topic cluster IDs are submitted to the NLG with instructions to assign an existing or seeded label where appropriate. As NLG models seem to struggle with multi-step, conditional tasks, the prompt may be broken down into discrete tasks wherein the NLG is first instructed to assign the most appropriate topic label given a list of guided topic labels (the seeded and top n labels) and assign the label "unknown" (or similar) if the keywords do not fit an existed guided label. In the event that "unknown" (or similar) is assigned, the NLG is instructed to exercise its own judgement and assign the topic label it thinks is most appropriate for the given list of keywords. Using this methodology, the NLG either selects the label assigned by the NLU (using the guided label when the NLU found a suitable guided label) or uses the new label that the NLG generated for the list of keywords for that topic.

While the NLP topic generator 620 and topic smoothing engine 630 are shown and described here as separate components or stages in a process, in some embodiments the topic smoothing engine 630 may be integrated into the NLP topic generator 620 rather than as separate components or stages.

Figure 7:
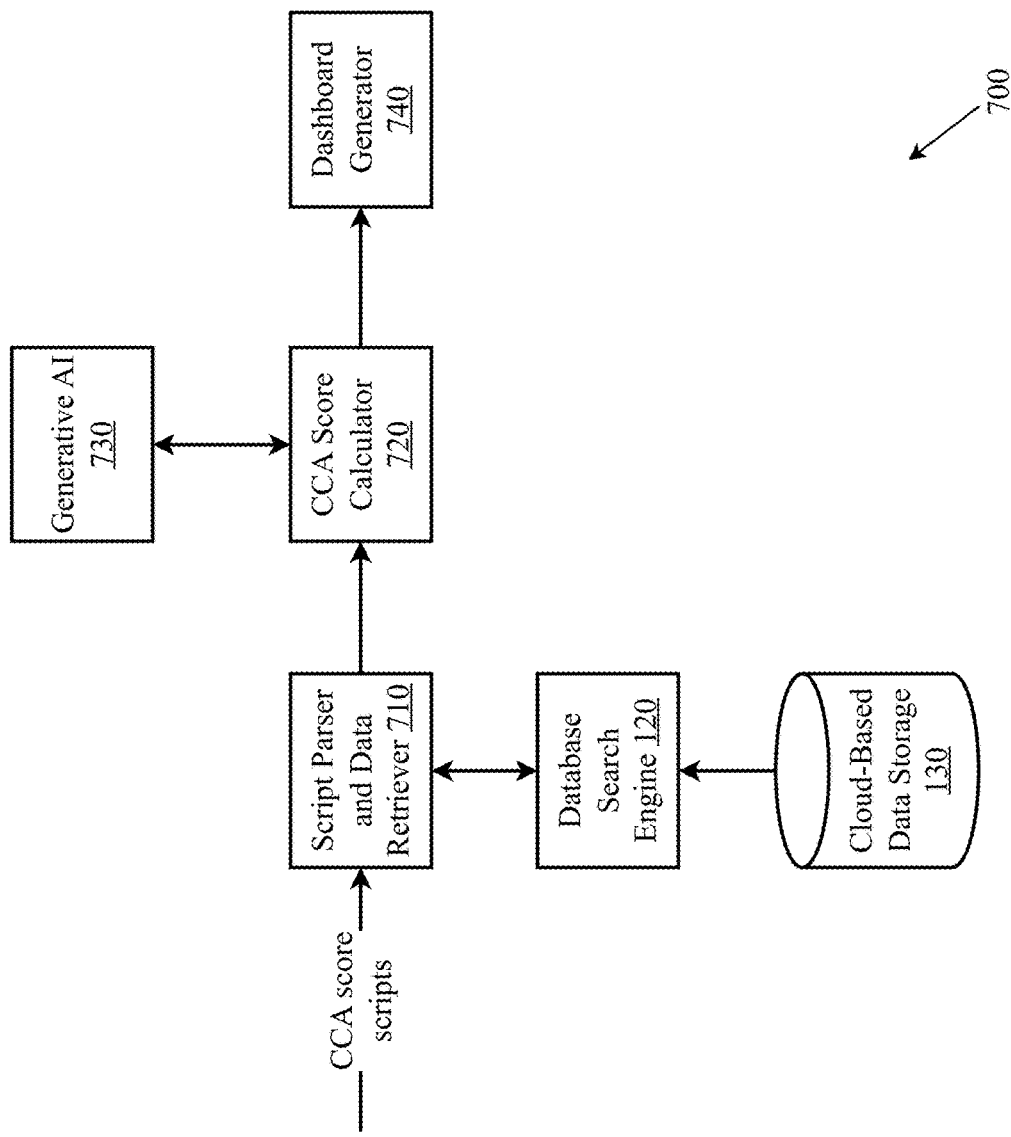
FIG. 7 is a block diagram illustrating an exemplary system architecture for a CCA score generator aspect of an automated conversational analysis system for computerized conversational agents.

FIG. 7 is a block diagram illustrating an exemplary system architecture for a CCA score generator aspect of an automated conversational analysis system for computerized conversational agents. The system and method described herein provide CCA administrators with the insight and evidence for improvement of the quality of conversations of the CCA by suggesting actionable steps to improve the conversational experience. While existing tools focus purely on quantitative metrics such as conversational duration, time-of-day usage, etc., the system and method described herein evaluate qualitative aspects of conversations, analyzing why, how, and how well the CCA operates, rather than simply providing quantitative numbers such as number of messages, conversation times and durations, etc. The qualitative analysis results generated by the system and method described herein may interpreted and displayed numerically (e.g., in the form of percentages, scored, etc.) to allow for easy understanding and historic comparison, but this should not be confused with quantitative analysis. The qualitative analysis results generated by the system and method described herein provide statistical information about qualities of the conversations held by the CCA, not mere quantities of events occurring within the data.

A further advantage of the system described herein is that, for each of the CCA qualities scored, the system allows an administrator to quickly view example conversations matching each segment of the feature analysis. This, in itself, removes a huge time burden from administrators who often have to manually review conversations at random and therefore cannot see the patterns or correlations from the bigger picture. While the analyses are automated, the system provides a framework for detailed manual review of relevant conversations organized by objective so that administrators can immediately see a given problem with CCA quality in the context of a defined objective rather than having to manually search for conversations with similar quality issues.

In some embodiments, qualitative analysis results for each conversational indicator generated by the system and method described herein may be interpreted and displayed numerically (e.g., in the form of percentages, scored, etc.).

In some embodiments, an overall CCA score may be generated, comprising a summary of one or more conversational indicator frequencies. In some embodiments, the overall CCA score is a straightforward metric based on the frequency of each negative indicator within the transcript data. Weights may be applied to each indicator frequency score according to importance. The score may be represented as a percentage. Exemplary numerical indicator calculations for certain conversational indicators are described in detail in FIG. 15 and its associated text, along with an exemplary overall CCA scoring function which provides weighted scoring of a plurality of conversational indicators. Other scoring functions may be used, including automated scoring generated by a generative artificial intelligence (GAI) system trained to produce numerical indicators of qualities of a CCA as suggested by its conversational indicators.

The CCA score generator of this embodiment comprises a script parser and data retriever 710, a CCA score calculator 720, and a dashboard generator 740.

The script parser and data retriever 710 receives CCA score scripts generated by the CCA score script generator 230, parses them, and uses a database search engine 120 to search for and retrieve relevant conversations from a cloud-based data store 130. The database search engine 120 may be of any suitable type, but in this embodiment is a cloud-based service such as Elasticsearch.

The CCA score calculator 720 calculates numerical indicators (e.g., scores, percentages, etc.) for one or more of the conversational indicators and/or an overall CCA score which combines numerical indicators for a plurality of conversational indicators. Exemplary numerical indicator calculations for certain conversational indicators are described in detail in FIG. 15 and its associated text, along with an exemplary overall CCA scoring function which provides weighted scoring of a plurality of conversational indicators. Other scoring functions may be used, including automated scoring generated by a generative artificial intelligence (GAI) system 730 trained to produce numerical indicators of qualities of a CCA as suggested by its conversational indicators.

The dashboard generator 740 provides visual representations of the numerical indicators of conversational quality described above. Exemplary CCA analysis results showing examples of displays which may be generated by the dashboard generator 740 for use by an administrator are described in FIGS. 17-19 and their associated text.

Figure 8:
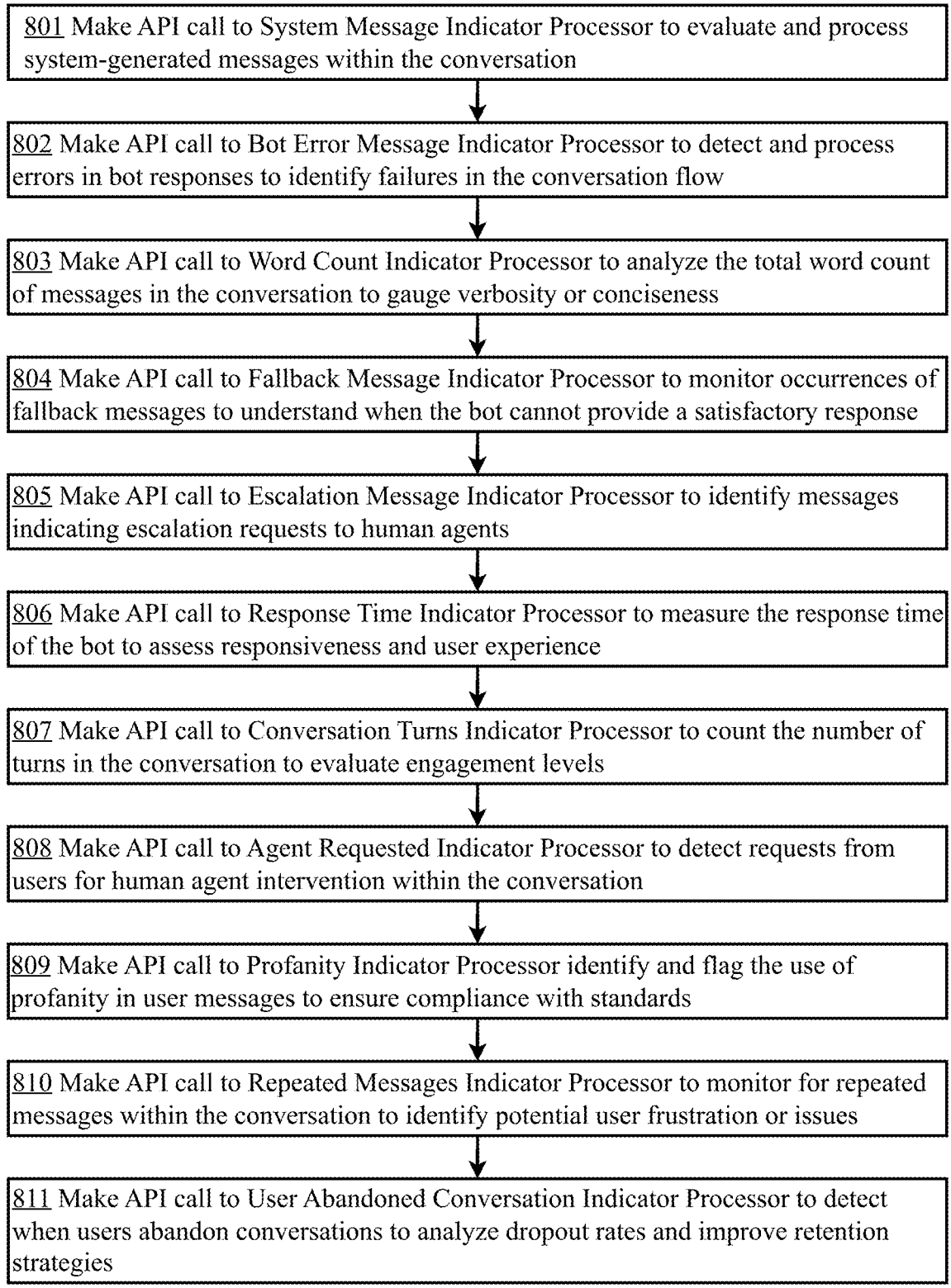
FIG. 8 is a flow diagram illustrating an exemplary algorithm for conversation indicator extraction for automated analysis of computerized conversational agent conversational data.

FIG. 8 is a flow diagram illustrating an exemplary algorithm for conversation indicator extraction for automated analysis of computerized conversational agent conversational data.

In a first step, an API call is made to a system message indicator processor 801 to evaluate and process system-generated messages within the conversation. In this embodiment, the system message indicator processor performs the following operations. The processor retrieves and reviews an expected payload setting from the stored configurations created by the administrator. The expected payload setting comprises a list of predefined system messages expected to be in the conversations. The processor checks to see whether these messages exist and processes them as system messages. For each expected system message, the processor creates a lowercase version of the messages to ensure comparisons are case insensitive. It then iterates through each message in the conversation to identify those authored by the CCA or user that match any expected system messages. When a match is found, the processor updates the message's author to indicate that the message is a system message. If the message does not have any existing indicators, it initializes a new indicators object with the corresponding system message ID. It also updates the conversation's indicators to include this system message ID, ensuring it is captured for further analysis. After processing, the system returns an indicator response, confirming the success of the operation and containing the updated payload reflecting the changes made to the conversation messages and indicators.

In a second step, an API call is made to an error message indicator processor 802 to detect and process errors in CCA responses to identify failures in the conversation flow. In this embodiment, the error message indicator performs the following operations. The processor first checks the expected messages from the payload to extract the relevant error messages. If error messages are defined, it prepares to process them; otherwise, it returns "none." The processor iterates through each message in the conversation. For each message authored by the CCA, it converts the message text to lowercase for case-insensitive comparison. It checks if the message contains any of the expected CCA error messages. If a match is found and the message does not already have an error message ID, the processor updates the message's indicators to include this ID. If the conversation's indicators do not exist, it initializes them and adds the error message ID to the conversation's metadata, maintaining a record of all error messages encountered. The processor concludes by returning an expected message indicator response, indicating the successful processing of the message and containing the updated message reflecting the new indicators.

In a third step, an API call is made to a word count indicator processor 803 to analyze the total word count of messages in the conversation to gauge verbosity or conciseness. In this embodiment, the word count indicator processor performs the following operations. The processor iterates through each message in the conversation payload, specifically focusing on messages authored by the CCA. For each CCA message, the processor calculates the total number of words by splitting the message text and counting the resulting elements. If the message does not already have indicators, the processor initializes a new indicators object and sets the word count to the calculated value. If indicators already exist, it simply updates the word count field with the new value. Finally, the processor returns an indicator response, indicating successful processing and containing the updated payload with the new word count indicators included in the CCA messages.

In a fourth step, an API call is made to a fallback message indicator 804 processor to monitor occurrences of fallback messages to understand when the CCA cannot provide a satisfactory response. In this embodiment, the fallback message indicator processor performs the following operations. The processor first retrieves the list of expected fallback messages from the expected messages object. The process message method examines each CCA message in the conversation to convert the CCA message to lowercase for case-insensitive comparison and check whether the CCA is the author of the message and if the message contains a fallback keyword. If a fallback message is found, the processor looks for the preceding user message and the initial CCA message that generated the user's response. It reverses through the conversation messages until it finds the user response followed by the last CCA message, establishing context for fallback processing. The processor then invokes a fallback type discriminator service (described in detail later herein) to determine the nature of the fallback (e.g., the fallback message type). This step assesses the interaction between the initial CCA message, the user's response, and the current CCA message to classify the fallback type. If indicators do not exist, the processor creates a new indicators object, setting the fallback message ID, fallback type, trigger message, and trigger message ID. If indicators are already present, it updates the respective fields with the new values. The processor checks if conversation indicators exist; if not, it initializes a new conversation indicators object. It appends the fallback message ID and fallback type to their respective lists if they are not already present. Finally, the processor returns an expected message indicator response, indicating successful processing and containing the updated message with fallback indicators.

In a fifth step, an API call is made to an escalation message indicator processor 805 to identify messages indicating escalation requests to human agents. In this embodiment, the escalation message indicator processor performs the following operations. The processor starts by retrieving the expected escalation messages from the provided expected messages object. Each message from the conversation is converted to lowercase to enable case-insensitive comparisons. The processor checks if the message is authored by the CCA and contains the expected escalation message. If the conditions for an escalation message are met and no existing indicators are found, the processor creates a new indicators object, setting the escalation message ID to the ID of the expected message. If indicators already exist, it updates the escalation message ID to reflect the new expected message. The processor then checks whether conversation-level indicators exist. If they do not exist, it initializes a new conversation indicators object, appending the escalation message ID to the list. If conversation indicators are present, it checks if the escalation message ID is already in the list. If not, it appends the ID to ensure a cumulative record of escalation messages. Finally, the processor generates an expected message indicator response, indicating successful processing and returning the updated message that now includes the escalation indicators.

In a sixth step, an API call is made to a response time indicator processor 806 to measure the response time of the CCA to assess responsiveness and user experience. In this embodiment, the response time indicator processor performs the following operations. The processor iterates through each message in the conversation transcript, focusing on messages authored by the CCA or system to gather response time data. For each message, it checks the timestamp of the previous message to calculate the response time. If the current message is the first in the conversation, the response time is set to zero. Otherwise, the processor computes the time difference in milliseconds between the current message's timestamp and that of the previous message. If the message does not have existing indicators, a new indicators object is created to store the calculated response time. If indicators are already present, the processor updates the responseTimeInMilliseconds property with the newly calculated value. When the message is authored by the CCA, the processor checks for the existence of conversation-level indicators. If none exist, it initializes a new conversation indicators object to record the CCA's response times. If conversation indicators are present, it appends the new response time to the list, ensuring it is unique to avoid duplication. Finally, the processor returns an indicator response, indicating the operation was successful and including the modified payload that reflects all updates made to the conversation messages and indicators.

In a seventh step, an API call is made to a conversation turns indicator processor 807 to count the number of turns in the conversation to evaluate engagement levels. In this embodiment, the conversation turns indicator processor performs the following operations. The processor begins by initializing a counter (turns) to zero, which will be used to track the number of turns taken in the conversation. It iterates through each message in conversation messages payload. During this iteration, the processor checks the author of each message. For each message authored by anyone other than the system (i.e., user or CCA), the processor increments the turns counter by one. This step effectively counts the total number of turns in the conversation, excluding system messages. After counting the turns, the processor checks if the conversation indicators attribute in the payload exists. If it does not exist, a new conversation indicators object is created with the current turns count. If it already exists, the processor updates the turns property of the existing indicators with the new count. Finally, the processor returns an indicator response, confirming the successful processing of the operation and containing the updated payload, which reflects the changes made to the conversation indicators.

In an eighth step, an API call is made to an agent requested indicator processor 808 to detect requests from users for human agent intervention within the conversation. In this embodiment, the agent requested indicator processor performs the following operations. The system examines each user message in the conversation payload to identify those authored by the user. Only user messages are processed, ensuring that agent request detection is focused solely on the user's intent. For each user message, the system splits the message text into individual sentences; strips punctuation from words (except for specific redacted entities denoted by double brackets, e.g., [[entity]]), allowing for accurate keyword matching; checks each word and phrase against a pre-defined list of agent request keywords, including terms such as "agent," "human," or "representative," and phrases like "speak to someone"; If a keyword or phrase indicating an agent request is found, the system flags that message as containing an agent request. When a user message is flagged as an agent request: a. The system updates an "isAgentRequested" indicator on the message, marking it for agent escalation. b. The system increments an "agentRequestedCount" field in the conversation metadata, maintaining a cumulative count of agent requests throughout the conversation.

In a ninth step, an API call is made to a profanity indicator processor 809 to identify and flag the use of profanity in user messages to ensure compliance with standards and to identify issues of frustration, anger, and emphasis by the user. In this embodiment, the profanity indicator processor performs the following operations. The system examines each message in the conversation, specifically focusing on those authored by the user. Each user message is parsed into individual sentences. This step enables more accurate detection of profanity, as it allows for the analysis of context within each sentence. Before detecting profanity, the processor verifies the configured settings, specifically the confidence threshold established by the administrator. This threshold ensures that only sentences with a probability of containing profanity exceeding this benchmark are flagged, minimizing false positives. To refine the analysis, the processor identifies and applies a list of stop words specified by the administrator in the system settings. These excluded words are replaced with a neutral placeholder, preventing them from skewing the detection results. The processor evaluates the likelihood that each sentence contains profanity, calculating a probability score based on linguistic patterns. It compares this score against the previously validated confidence threshold to determine whether to indicate the presence of profanity. When profanity is detected, the system updates the message indicators accordingly. This includes flagging the message to indicate the presence of profanity, which enables further handling or reporting of inappropriate content. The processor also maintains a cumulative count of messages flagged for profanity throughout the conversation. This metric helps in assessing the overall tone and appropriateness of user interactions. Finally, the processor consolidates all findings and updates into a comprehensive response. This response confirms the success of the processing operation and reflects the updated state of the conversation, ensuring that all relevant indicators and metrics are available for subsequent analysis or action.

In a tenth step, an API call is made to a repeated messages indicator processor 410 to monitor for repeated messages within the conversation to identify potential user frustration or issues. In this embodiment, the repeated messages indicator performs the following operations. The processor begins by creating two lists to track discovered sentences from both the CCA and the user during the conversation. It iterates through each message in the conversation, focusing on those authored by either the CCA or the user. For each message, the processor breaks down the content into individual sentences. This granular approach facilitates a more precise assessment of sentence repetition. Each sentence is converted to lowercase to enable consistent comparisons. The processor then checks whether the sentence has been previously seen based on the author's type (CCA or user). It uses a helper method to determine if the sentence qualifies as a repeated message, which considers a minimum word count configured by the administrator. If a sentence is identified as a repeat, it is added to a list of repeated messages. The processor keeps track of these repeated messages for further analysis. After processing all sentences in a message, the processor updates the message's indicators. If repeated messages are found, it records them along with a count of how many times they occurred. The processor updates the overall conversation indicators to reflect the count of repeated messages for both the CCA and the user. This information is vital for understanding conversation dynamics and user interactions. Finally, the processor returns an indicator response, indicating the success of the operation and containing the updated payload. This payload includes all modifications made to the conversation messages and indicators, ensuring that the data is ready for subsequent processing or analysis.

In an eleventh step, an API call is made to a user abandoned conversation processor 411 to detect when users abandon conversations to analyze dropout rates and improve retention strategies. In this embodiment, the repeated messages indicator performs the following operations to determine whether either the user or the CCA has abandoned the conversation. The processor retrieves the settings related to acceptable CCA questions from the configuration and initializes an empty list for case-insensitive accepted questions. Acceptable CCA questions are excluded from the abandonment assessment. For example, if the CCA asks the user to complete a survey, or if the user needs help with anything else, a lack of a user response to these questions is not considered to indicate abandonment. The processor iterates through each message in the conversation, assessing the author of each message (either the CCA or the user) and taking appropriate actions based on the message content. For messages authored by the CCA, the processor checks if the message qualifies as an accepted question. If the message is recognized as an acceptable question, it continues to the next message without further evaluation. If the message is not an accepted question, the processor splits the message into sentences and determines whether any sentence is structured as a question. The pseudocode in FIG. 9 and its associated text describes the logic that assesses if each sentence contains a question.

FIG. 9 is a flow diagram illustrating exemplary pseudocode for assessing whether a sentence in a given conversation is a question for automated analysis of computerized conversational agent conversational data. In this embodiment, a function 901 is defined having several operations.

In a first operation 902, a set of common question words is defined such as in the following pseudocode:
Define a set of common question words
SET question words={
  "who", "what", "when", "where", "why", "how",
  "do", "does", "did", "is", "are", "was", "were",
  "can", "could", "will", "would", "should",
  "may", "might", "shall", "couldn't", "shouldn't",
  "wouldn't", "can't", "don't", "doesn't",
  "isn't", "aren't", "won't", "haven't", "hasn't",
  "hadn't"
}

In a second operation 903, each sentence in a conversation is checked to determine whether the sentence ends with a question mark (indicating a question) as in the following pseudocode:
Check if the sentence ends with a question mark
IF sentence ends with "?":
  RETURN True In a third operation 904, the first word of each sentence in a conversation is sanitized (i.e., normalized) by removing any punctuation and converting it to lower case, and the first word is checked to see whether it is contained within the set of question words previously defined (also indicating a question), as in the following pseudocode:
Sanitize the first word by removing punctuation and converting to lowercase
SET first word=extract first word (sentence)
SET sanitized first word=remove punctuation (first word) .toLowerCase( )
Check if the sanitized first word is in the set of question words
IF sanitized first word IN question words:
  RETURN True In a fourth operation 905, if neither of the above question-indicating checks is true, then the sentence is marked as not being a question, as in the following pseudocode:
If neither condition is met, return False
RETURN False In a fifth operation 906, another function is called to extract the first word of the sentence for further processing, as in the following pseudocode:
FUNCTION extract first word (sentence):
  # Split the sentence into words and return the first word
  SET words=split (sentence)
  RETURN words[0]

In a sixth operation 907, another function is called to remove any punctuation from the first word of the sentence, as in the following pseudocode:
FUNCTION remove punctuation(word):
  # Remove punctuation from the word
  RETURN word.translate(punctuation table)

FIG. 10 is a flow diagram illustrating an exemplary algorithm for fallback type discrimination for automated analysis of computerized conversational agent conversational data. The fallback type analyzer 500 of this embodiment uses the following exemplary fallback type discrimination algorithm 1000 to determine whether the fallback error was caused by a failure of the CCA to recognize the intent of the user or caused by a failure of the CCA's prompt to the user. In a first step, 1001, the fallback discriminator uses a database search engine 120 to search for and retrieve conversations from a cloud-based data store 130 wherein a fallback error has occurred. The database search engine 120 may be of any suitable type, but in this embodiment is a cloud-based service such as Elasticsearch. Following retrieval of the relevant conversations, the fallback discriminator 510 extracts the fallback context 1002 for all CCA messages where a fallback indicator was assigned. In this embodiment, the fallback context extracted comprises the agent message indicated as containing a fallback message (the fallback), the customer message preceding the fallback, and the agent message that elicited the customer message preceding the fallback. The fallback context is formatted and appended to a base prompt 1003, which instructs a large language model (LLM) to assign the most appropriate fallback type (intent or prompt) based on the context 1004.

FIG. 11 is a flow diagram illustrating exemplary pseudocode for instructing an LLM assistant to perform fallback type discrimination for automated analysis of computerized conversational agent conversational data. In this embodiment, a data structure (here a JavaScript Object Notation (JSON) file) 1101 is created comprising instructions for a natural language processing (NLP) system (e.g., ChatGPT, OpenGPT, or another such system) to classify fallback messages as being either intent-based or prompt-based, depending on the context of the fallback message in the conversation.

In a first set of instructions 1102, the role of the NLP system is defined. In the following pseudocode, the LLM assistant is told that its role is to assist in categorizing fallback types in fallback messages of a conversation. The LLM assistant is told that it is to classify fallback types as either "intent-based," "prompt-based," or "unknown," depending on the context of the fallback message.

```
prompt_json={
    "messages": [
        {
            "role": "system",
            "content": "You are an assistant categorizing the
                fallback type in a Conversational AI (CAI)
                system. A fallback is triggered when the system
                cannot understand or respond. The two fallback
                types are:
                'PROMPT' when the system expects a specific
                    response but receives an unexpected user input.
                'INTENT' when the system cannot determine the
                    user's intent. If the type is unclear, respond with
                    'UNKNOWN'."
        },
```

In a second set of instructions 1103, an example of a prompt-based fallback type is provided to the LLM assistant wherein the user's response ("How do I find my serial number?") does not match the CCA's prompt ("When you are ready, say ready."), as in the following pseudocode:

```
            "role": "user",
            "content": "Agent: When you are ready, say ready. User:
                How do I find my serial number? Agent: I'm sorry, I
                didn't get that."
        }, {
            "role": "assistant",
            "content": "PROMPT"},
        {
```

In a third set of instructions 1104, an example of an intent-based fallback type is provided to the LLM assistant wherein the CCA does not understand the intent of the user's request ("How much does a plan cost?"), as in the following pseudocode:

```
            "role": "user",
            "content": "Agent: How can I help you today? User: How
                much does a plan cost? Agent: I'm sorry, I didn't get
                that, try again using different words."},
        {
            "role": "assistant", "content": "INTENT"
        }]
}
```

In a fourth set of instructions 1105, a new message is provided to the LLM assistant for classification based on the instructions provided above, as in the following pseudocode:

```
content_template="agent:    {agent_prompt}    user:
    {user_response} agent: {fallback}"
new_message={
    "role": "user",
    "content": content_template}
prompt_json['messages'].append(new_message)
```

FIG. 12 is a flow diagram illustrating an exemplary algorithm for topic modeling for automated analysis of computerized conversational agent conversational data. In this embodiment, the algorithm comprises two stages, a topic generation stage 1210 and a topic smoothing stage 1220. While the topic generation stage 1210 and topic smoothing stage 1220 are shown and described here as separate stages in a process, in some embodiments the topic smoothing stage 1220 may be integrated into the topic generation stage 1210 rather than as separate components or stages.

The topic generation stage 1210 of this embodiment comprises the following four steps. At step 1211, a labeled list of topics (e.g., key value pairs where the key corresponds to the desired topic label and the values are a list of keyword strings the administrator wishes to be associated with that topic) is received from an administrator as seed material for guided topic modeling. This step is optional in some embodiments. At step 1212, currently-assigned and previously-assigned topic labels are sampled from a data store of such topic labels on a rolling window (e.g., past 7 days). At step 1213, the labeled list of topics, if any, and sampled topic labels are provided as data to a natural language understanding (NLU) engine with instructions to assign topic labels to the data (e.g., as TF-IDF, short for Term Frequency-Inverse Document Frequency keywords). At step 1214, the assigned topic labels and a list of frequently-occurring labels (e.g., from the data store of such labels) are sent to a natural language generation (NLG) engine to generate human-readable labels corresponding to the assigned topic labels.

The topic smoothing stage 1220 of this embodiment comprises the following three steps. At step 1221, a set of frequently-occurring topics in the data store (e.g., the top n most frequency-occurring topic labels from a period y) is sampled as seeded topics. At step 1222, topic cluster IDs are retrieved from the data store associated with the sampled seeded topics. Note that, in this embodiment, topic cluster IDs are generated by the NLU for each run and are not necessarily consistent across runs. Therefore, at this step, topic cluster IDs retrieved are those associated with the seeded topics for a given run. The seeded topics and their topic cluster IDs for that run are combined into a list of guided topic labels. In other embodiments, topic cluster IDs may be consistent across runs. At step 1223, the seeded topics and topic cluster IDs are sent to an NLG engine to assign topic labels to the assigned topic labels with instructions to: if the keywords fit an existing list of guided topic labels (the seeded and top n labels), then assign the most appropriate topic label from the list of guided topic labels (the seeded and top n labels); if the keywords do not fit an existed guided label, assign a label based on the NLG engine's own judgement as to a label it thinks is most appropriate for the given list of keywords.

FIG. 13 is a flow diagram illustrating exemplary pseudocode for instructing an NLG to generate topic topics for automated analysis of computerized conversational agent conversational data. In this embodiment, instructions are provided for a natural language generating (NLG) system (e.g., ChatGPT, OpenGPT, or another such system) to generate human-readable topics from a combination of TF-IDF derived keywords previously generated by an NLU, seeded labels, and any existing labels in a data store. Thus, in this embodiment, the TF-IDF derived keywords, seeded labels provided by the administrator, and any frequently-occurring labels in the data store are provided to the NLG engine 624 to generate (or infer) human-readable labels for display to the administrator. To ensure consistency in topics generated by the NLG (topic smoothing), the instructions provided to the NLG include instructions to use an existing seeded or previously assigned label where appropriate.

In a first set of instructions 1301, the NLG is provided with a set of indices and associated keywords (the TF-IDF derived keywords) and any seeded topic labels or frequently-occurring topic labels, as in the following pseudocode:

I have a set of indices and associated keywords, as follows:

{keywords_json}

In a second set of instructions 1302, the NLG is told to generate a data structure (in this case a JSON) where each index is associated with either a seeded (guided) label or an NLG-generated topic label, as in the following pseudocode:

For each index, generate a JSON structure where each index is associated with two topic labels:
  A guided topic label based on the provided topic list, and
  An unguided topic label that reflects the common theme of the keywords for that index.

In a third set of instructions 1303, the NLG is provided more specific instructions for assigning the label "unknown" if a topic label cannot be found or generated, or to assign a specific label under certain conditions (such as assigning "Agent Request" when keywords suggest that a user wants to speak to a person), and other specific instructions, as in the following pseudocode: Specific instructions for generating the topic labels:

The guided topic label must be chosen from the topic list below. If the keywords do not directly match a topic in this list, assign the label "Unknown."

If the keywords suggest that the user wants to speak to a person, assign the guided label "Agent Request," overriding other label choices.

The unguided topic label should be generated independently of the topic list, purely based on the common theme of the keywords for that index. Do not reuse any punctuation in this label; words should be separated by spaces only and capitalized.

Ensure consistency across runs by using inflections of the same noun only once (e.g., use "request" instead of "requests"). When generating the unguided label, attempt to match any close or semantically related topics from the guided list, if applicable, before creating new labels.

In a fourth set of instructions 1304, the NLG is provided with a seeded list of topics (aka a guided topic list), as in the following pseudocode:

Guided Topic List:
{topic_list}

In a fifth set of instructions 1305, the NLG is provided with an output format to use, as in the following pseudocode:

Format the output as a valid JSON object with the following structure:
{
"index1": ["guided_topic_label1", "unguided_topic_label1"],
"index2": ["guided_topic_label2", "unguided_topic_label2"], . . . .

Figure 14:
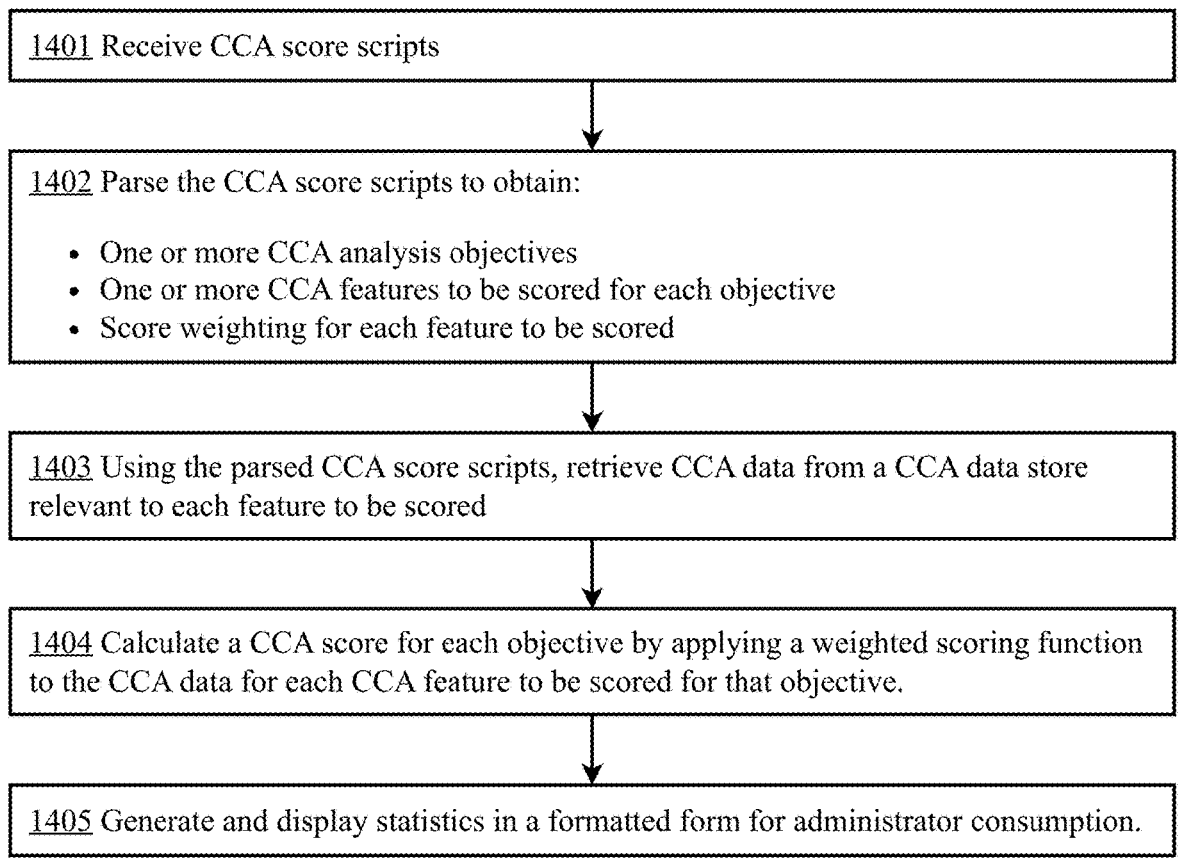
FIG. 14 is a flow diagram illustrating an exemplary algorithm for CCA score generation for automated analysis of computerized conversational agent conversational data.

FIG. 14 is a flow diagram illustrating an exemplary algorithm for CCA score generation for automated analysis of computerized conversational agent conversational data. In this embodiment, the algorithm comprises the following five steps. At step 1401, CCA score scripts are received (e.g., from the CCA score script generator 230 of FIG. 2). At step 1402, the CCA score scripts are parsed to obtain: one or more CCA analysis objectives; one or more CCA features to be scored for each objective; and score weighting for each feature to be scored. At step 1403, using the parsed CCA score scripts, a transcript is retrieved from a data store relevant to each feature to be scored. At step 1404, a CCA score is calculated for each objective by applying a weighted scoring function to the transcript for each CCA feature to be scored for that objective. At step 1405, statistics are generated and displayed in a formatted form for administrator consumption.

FIG. 15 is a flow diagram illustrating exemplary weighting function for CCA score generation for automated analysis of computerized conversational agent conversational data. In some embodiments, qualitative analysis results for each conversational indicator generated by the system and method described herein may be interpreted and displayed numerically (e.g., in the form of percentages, scored, etc.). In some embodiments, an overall CCA score may be generated, comprising a summary of one or more conversational indicator frequencies. In some embodiments, the overall CCA score is a straightforward metric based on the frequency of each negative indicator within the transcript data. Weights may be applied to each indicator frequency score according to importance. The score may be represented as a percentage.

An exemplary overall CCA scoring function may be defined as follows:

$$\text{Weighted Score} = (w_1 \times s_1) + (w_2 \times s_2) + \ldots + (w_n \times s_n)$$

Where:
  $w_1, w_2, \ldots, w_n$ are the weights (relative importance for each indicator, total values sum up to 1)
  $s_1, s_2, \ldots, s_n$ are the corresponding scores for each indicator
  n is the total number of components being weighted Exemplary conversational indicator scores to be weighted by the scoring function may include, but are not limited to the following. Further, each of these qualitative conversational indicators may be assigned a numerical indicator such as, but not limited to, those defined in the following examples.

A fallback score may be calculated as a frequency of fallback messages as a percentage of total agent messages for a given time period.

An error score may be calculated as a frequency of error messages as a percentage of total agent messages for a given time period.

A negative sentiment score may be calculated as a frequency of conversations containing a customer message indicating the customer was angry as a percentage of all conversations for a given time period.

A repeated agent message score may be calculated as a frequency of repeated agent messages as a percentage of total agent messages for a given time period.

A repeated customer message score may be calculated as a frequency of repeated customer messages as a percentage of total customer messages for a given time period.

An agent request score may be calculated as a frequency of customer messages containing an agent request as a percentage of total customer messages for a given time period.

An agent abandonment score may be calculated as a frequency of conversations indicating the agent abandoned the conversation as a percentage of the total number of conversations for a given time period.

A customer abandonment score may be calculated as a frequency of conversations indicating the customer abandoned the conversation as a percentage of the total number of conversations for a given time period.

In other embodiments, the CCA score may be assigned by processing the conversation indicators through a trained machine learning algorithm to automatically weight and calculate the scores based on the machine learning algorithm's understanding of the importance of each conversational indicator based on its training data.

Figure 16A:
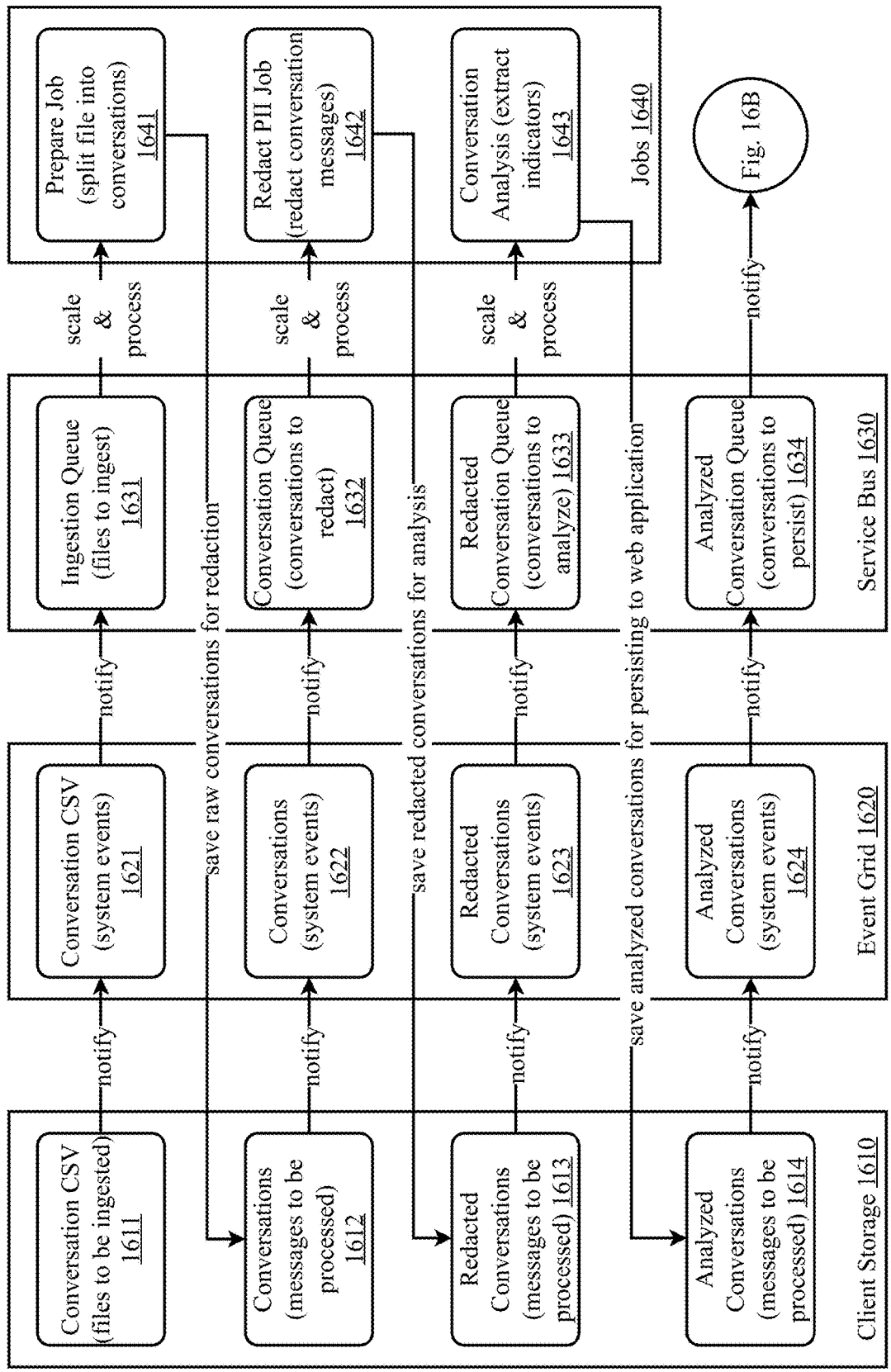
FIGS. 16A & 16B are a flow diagram illustrating an exemplary process flow diagram for a system for automated analysis of computerized conversational agent conversational data.
Figure 16B:
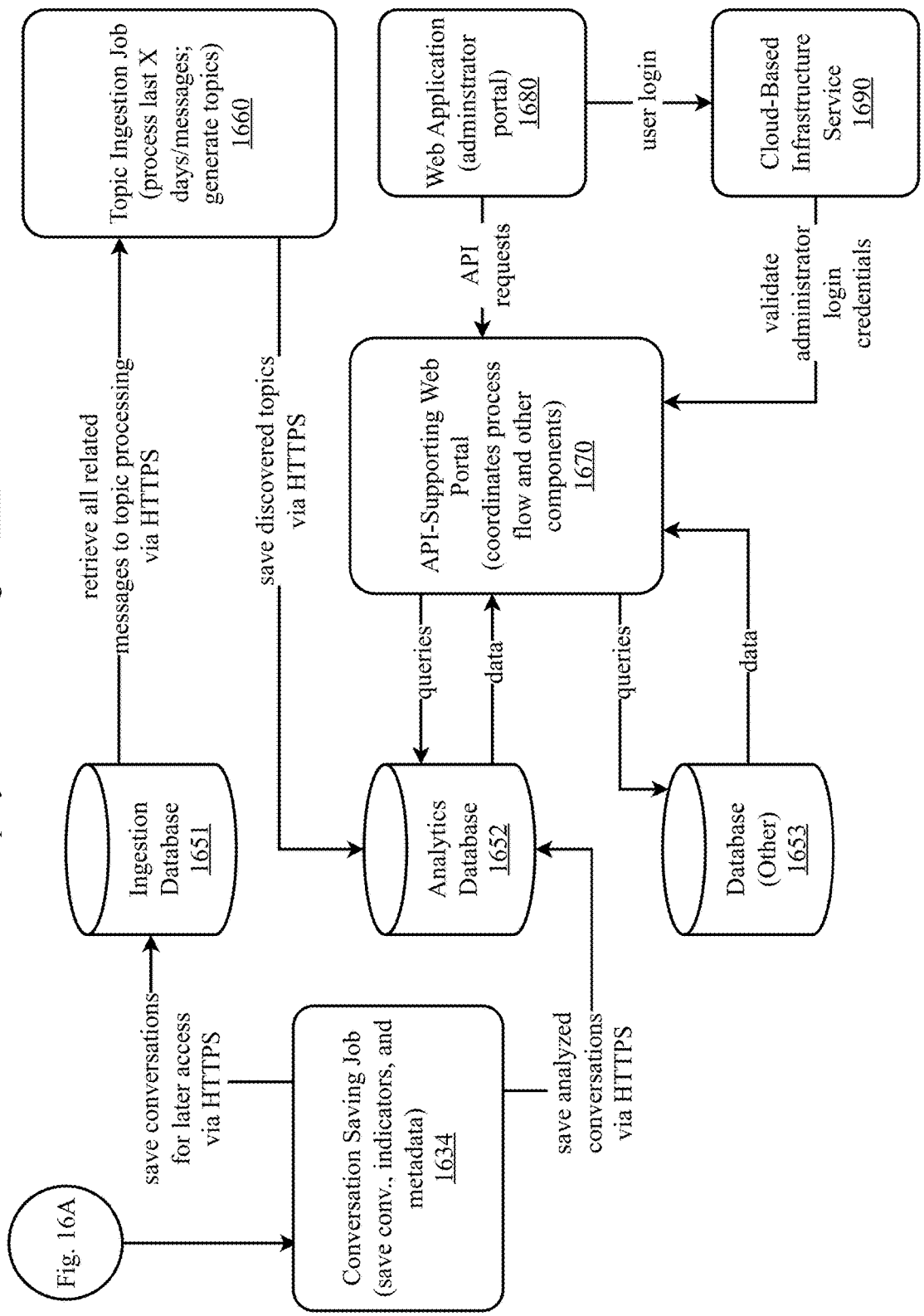

FIGS. 16A & 16B are a flow diagram illustrating an exemplary process flow for a system for automated analysis of computerized conversational agent conversational data. In this embodiment, the system is configured as a cloud-based distributed web application with components of the system interacting via API calls and other networking means. In this embodiment, the conversation indicator analysis is performed as part of the data ingestion process, but the conversational analysis performed is the same as that described above for previous embodiments. The system 1600 of this embodiment, comprises a data ingestion stage shown in FIG. 16A and a web application stage shown in FIG. 16B.

The data ingestion stage comprises client storage events 1610 wherein data is stored or retrieved using cloud-based databases, an event grid 1620 which tracks system events and sends notifications to a service bus 1630, the service bus 1630 which provides the system with a centralized communications structure and protocol, and processing jobs 1640 which perform pre-defined operations when called via API calls.

In this process, the data ingestion stage comprises the following steps. A conversation data file (such as a file containing a comma separated values data structure) is stored 1611 in client storage 1610, and a notification 1621 is sent to the event grid 1620 that the conversation data file is ready for processing. The event grid 1620 notifies the service bus 1630 that the file is in the ingestion queue 1631. The service bus 1630 scales and processes the file by making one or more API calls to prepare the processing job by splitting the file into conversations 1641. The raw conversations are saved to storage 1612, and a notification 1622 is sent to the event grid that the conversations are ready for PII redaction. The event grid 1620 notifies the service bus 1630 that the conversations are in the ingestion queue 1632. The service bus 1630 scales and processes the conversations by making one or more API calls to a job that redacts personally identifiable information (PII) from the conversations 1642. The redacted conversations are saved to storage 1613 for conversational analysis, and a notification 1623 is sent to the event grid that the conversations are ready for conversational analysis. The event grid 1620 notifies the service bus 1630 that the conversations are in the ingestion queue 1633. The service bus 1630 scales and processes the conversations by making one or more API calls to a job that performs extracts conversational indicators 1643 from the conversations in the same manner as described above for the conversation indicator extractor 400 of FIG. 4 and its associated text. The analyzed conversations are saved to storage 1614 for further analysis and handling by the web application stage, and a notification 1624 is sent to the event grid that the analyzed conversations are ready for further analysis and handling. The event grid 1620 notifies the service bus 1630 that the conversations are in the analyzed conversation queue 1633 and ready for further analysis and handling. The service bus 1630 notifies the web application of FIG. 16B that the analyzed conversation queue is ready for further analysis and handling.

In this process, the web application stage comprises the following steps. An API call is made to a conversation saving job 1634 to save conversation indicators and any metadata that is generated during the data ingestion stage. The conversation saving job saves conversations for later access in an ingestion database 1651 and analyzed conversations (i.e., those with extracted conversational indicators) in an analytics database 1652. An API call is made to a topic ingestion job 1660 which processes messages based on a time window (e.g., a seven-day rolling window) to generate topics (in the same manner as described for the topic modeling engine of FIG. 6 and its associated text). The generated topics are saved back to the analytics database 1652. An API-supporting web portal 1670 coordinates the process flow and other components, sending data queries to the analytics database and/or other databases 1653 for data retrieval (in the manner of the database search engine 120 and cloud-based data storage 130 of previously-described embodiments). A web application 1680 provides a client portal for CCA administrators to perform conversational analyses (in the manner as described for previous embodiments), logging in to the web application 1680 using a cloud-based infrastructure service 1690 which validates the administrator's login credentials to provide secure access to the system. As the administrator performs conversational analyses, the web application 1680 sends API requests to the API-supporting web portal which makes API calls to other cloud-based components and jobs to perform the requested conversational analysis services.

In other embodiments, similar processes may be implemented on other computer systems such as local computers, networked computers, and virtual machines, or any combination of computer systems as described herein.

Figure 17:
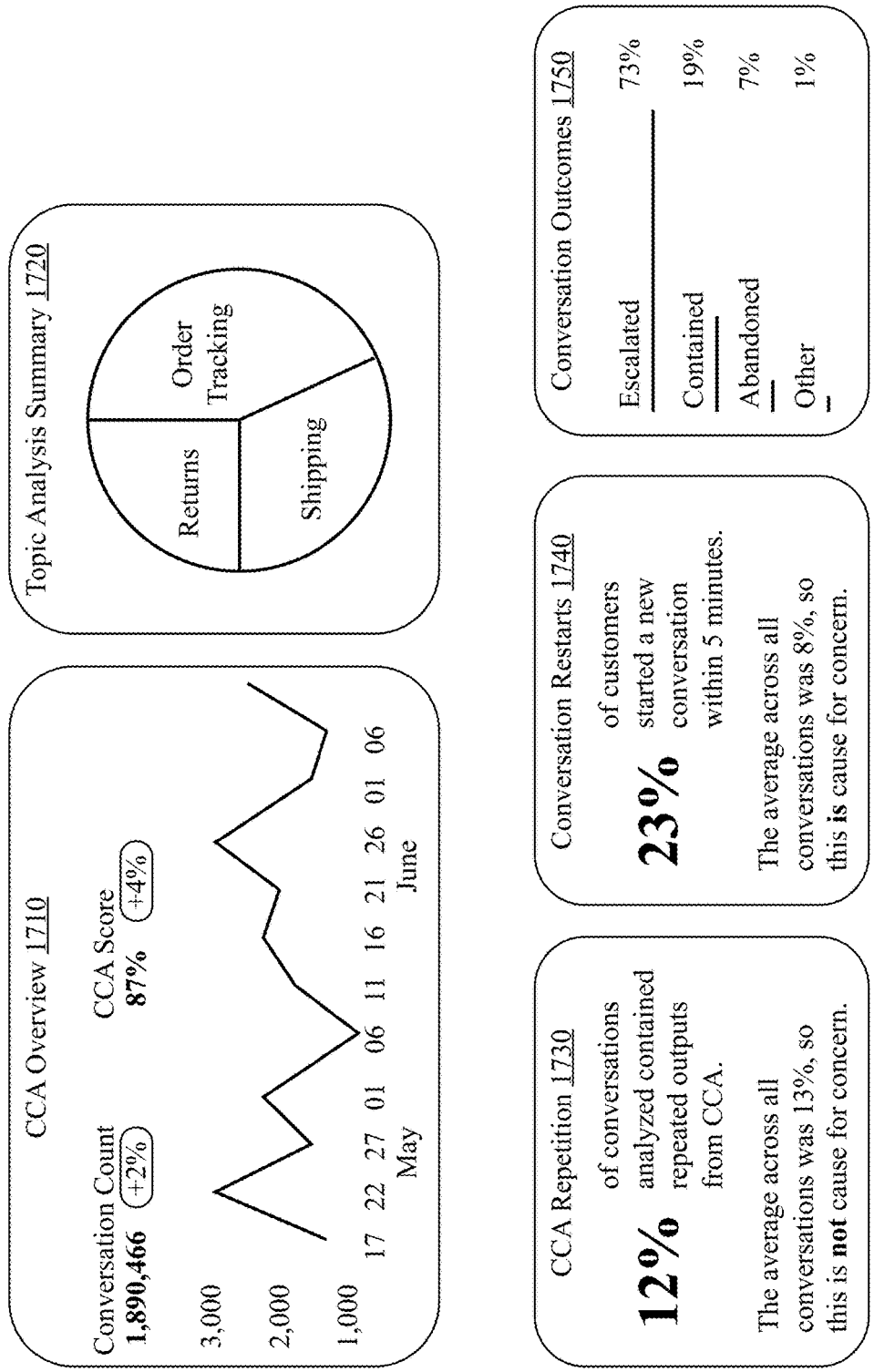
FIG. 17 illustrates exemplary analysis results for a system for automated analysis of computerized conversational agent conversational data.

FIG. 17 illustrates exemplary analysis results for a system for automated analysis of computerized conversational agent conversational data. In this diagram, several exemplary CCA analysis results 1700 are shown: a CCA overview 1710, a topic analysis summary 1720, a CCA repetition numerical indicator 1730, a conversational restarts 1740 numerical indicator, and a conversation outcomes 1750 breakdown. These exemplary analysis results describe and explain to the administrator various aspects of the quality of conversations engaged in by a CCA. Note that these examples are not necessarily all related to the same CCA or the same conversational analyses. They are merely indicative of the types of information that may be generated and displayed to an administrator for review and CCA correction.

The CCA overview 1710 provides an overview of conversations engaged in by the CCA, in this example showing that 1,890,466 conversations were held (a quantitative measure), representing a 2% increase over the preceding period, and that the overall CCA score (a qualitative measure) for this particular CCA over those conversations was 87%, representing a 4% increase over the preceding period. A line graph showing the number of conversations held by date is also included to show usage of the CCA over time.

A topic analysis summary 1720 organizes topics generated into higher-level summary topics. Here, the topic analysis shows that the topics identified fall into one of three high-level categories: returns, order tracking, and shipping.

A CCA repetition numerical indicator 1730 shows that 12% of recent conversations analyzed contain repeated outputs from the CCA (a measure of the quality of the conversations being held by the CCA, as repeats tend to indicate poor understanding by the CCA of the user's requests). An average of 13% for all conversations is also provided for reference as well as an indicator that the numerical indicator for recent conversations is not a cause for concern.

A conversational restarts 1740 numerical indicator shows that in 23% of recent conversations the user restarted the conversation within five minutes (a measure of the quality of the conversations being held by the CCA, as restarts tend to indicate poor understanding by the CCA of the user's requests). An average of 8% for all conversations is also provided for reference as well as an indicator that the numerical indicator for recent conversations is a cause for concern because it deviates from the long-term average.

A conversation outcomes 1750 breakdown shows that a very large number of conversations (83%) resulted in escalations to a human agent (a measure of the quality of the conversations being held by the CCA, as escalations tend to indicate poor understanding by the CCA of the user's requests). Other outcomes included conversations that were contained (19%) within the CCA's capabilities (i.e., handled successfully by the CCA), conversations that were abandoned (7%), and other outcomes (1%).

A further advantage of the system and method described herein is that, for each of the CCA qualities scored, the system allows an administrator to quickly view example conversations matching each segment of the feature analysis. This, in itself, removes a huge time burden from administrators who often have to manually review conversations at random and therefore cannot see the patterns or correlations from the bigger picture. While the analyses are automated, the system provides a framework for detailed manual review of relevant conversations organized by objective so that administrators can immediately see a given problem with CCA quality in the context of a defined objective rather than having to manually search for conversations with similar quality issues.

Figure 18:
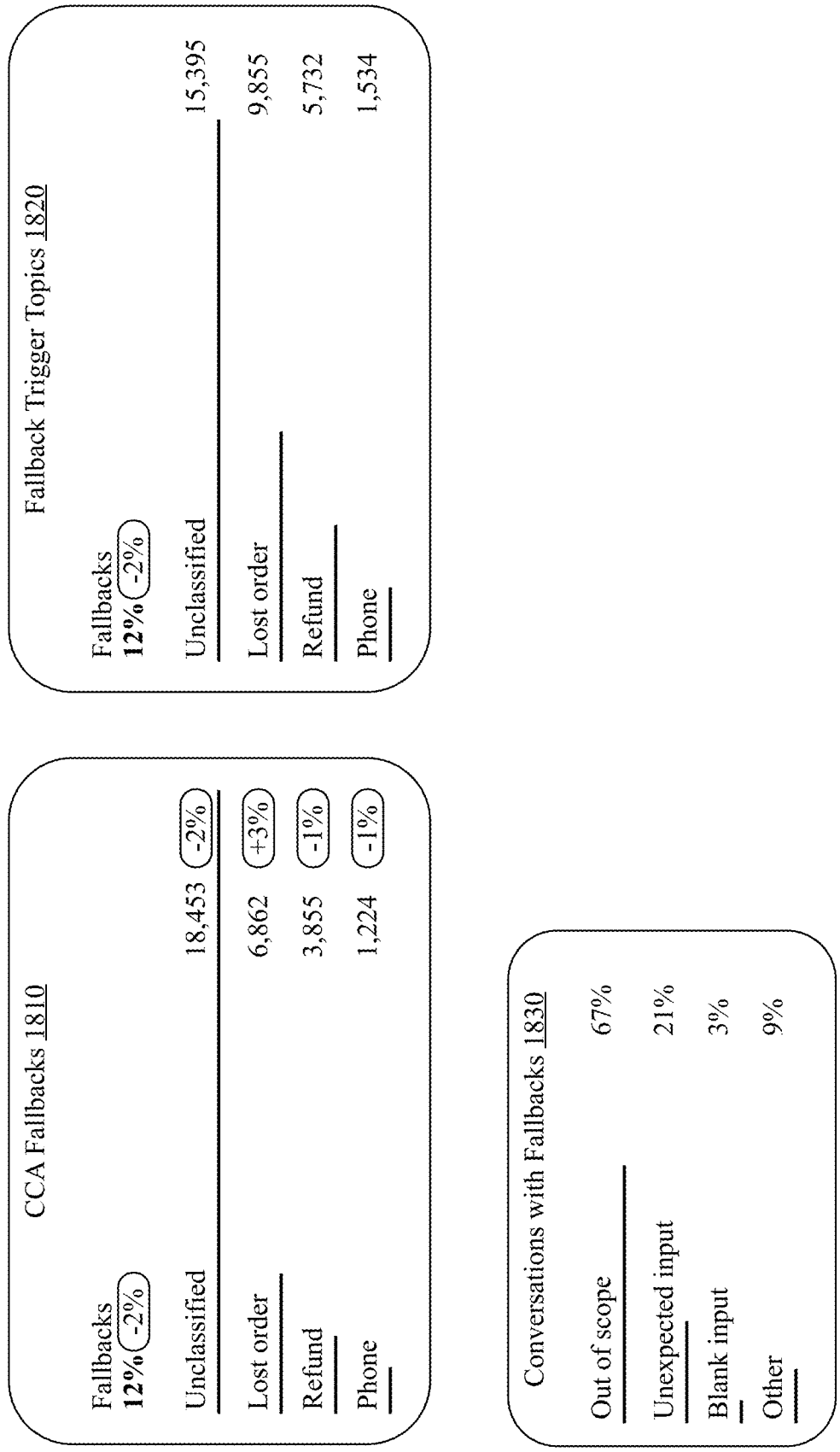
FIG. 18 illustrates additional exemplary analysis results for a system for automated analysis of computerized conversational agent conversational data.

FIG. 18 illustrates additional exemplary analysis results for a system for automated analysis of computerized conversational agent conversational data. In this diagram, several exemplary CCA analysis results 1800 are shown: a breakdown of CCA fallbacks and fallback trigger topics 1810, a fallback cause breakdown 1820, and a fallback type breakdown 1830. These exemplary analysis results describe and explain to the administrator various aspects of the quality of conversations engaged in by a CCA. Note that these examples are not necessarily all related to the same CCA or the same conversational analyses. They are merely indicative of the types of information that may be generated and displayed to an administrator for review and CCA correction.

The breakdown of CCA fallbacks and fallback trigger topics 1810 shows a numerical indicator of the percentage of fallbacks (12%) that have recently occurred (a measure of the quality of the conversations being held by the CCA, as escalations tend to indicate poor understanding by the CCA of the user's requests) and an indication that this is 2% fewer fallbacks than the average for all conversations. A breakdown of the topics triggering the fallbacks are also shown with 18,453 recent conversations having a fallback that is unclassified, representing 2% fewer unclassified fallback topics than for all conversations; 6,862 recent conversations having a fallback that is associated with lost orders, representing 3% more lost order fallback topics than for all conversations; 3,855 recent conversations having a fallback that is associated with refunds, representing 1% fewer refund fallback topics than for all conversations; and 1,224 recent conversations having a fallback that is associated with phone issues (e.g., poor audio quality), representing 1% fewer phone issues fallback topics than for all conversations.

The fallback cause breakdown 1820 shows a breakdown of the causes of the fallbacks with 67% of fallbacks being caused by out of scope conversations or messages; 21% of fallbacks being caused by unexpected inputs from the user; 3% of fallbacks being caused by blank inputs by the user; and 9% of fallbacks being caused by other issues.

The fallback type breakdown 1830 shows a breakdown of the fallback type (intent-based or prompt-based) with 57% of fallbacks being caused by intent-based problems; 30% of fallbacks being caused by prompt-based problems; and 13% of fallback types being unclassified (where the fallback type discriminator was unable to determine whether the fallback type was intent-based or prompt-based).

A further advantage of the system and method described herein is that the analysis results displayed are interactive. For each of the CCA analysis results provided by the system, some or all of the conversations that have produced the analysis results are linked to the analysis results, such that the system allows an administrator to click on the analysis results to quickly view example conversations matching each segment of the feature analysis. This removes a huge time burden from administrators who often have to manually review conversations at random and therefore cannot see the patterns or correlations from the bigger picture. While the analyses are automated, the system provides a framework for detailed manual review of relevant conversations organized by objective so that administrators can immediately see a given problem with CCA quality in the context of a defined objective rather than having to manually search for conversations with similar quality issues.

Figure 19:
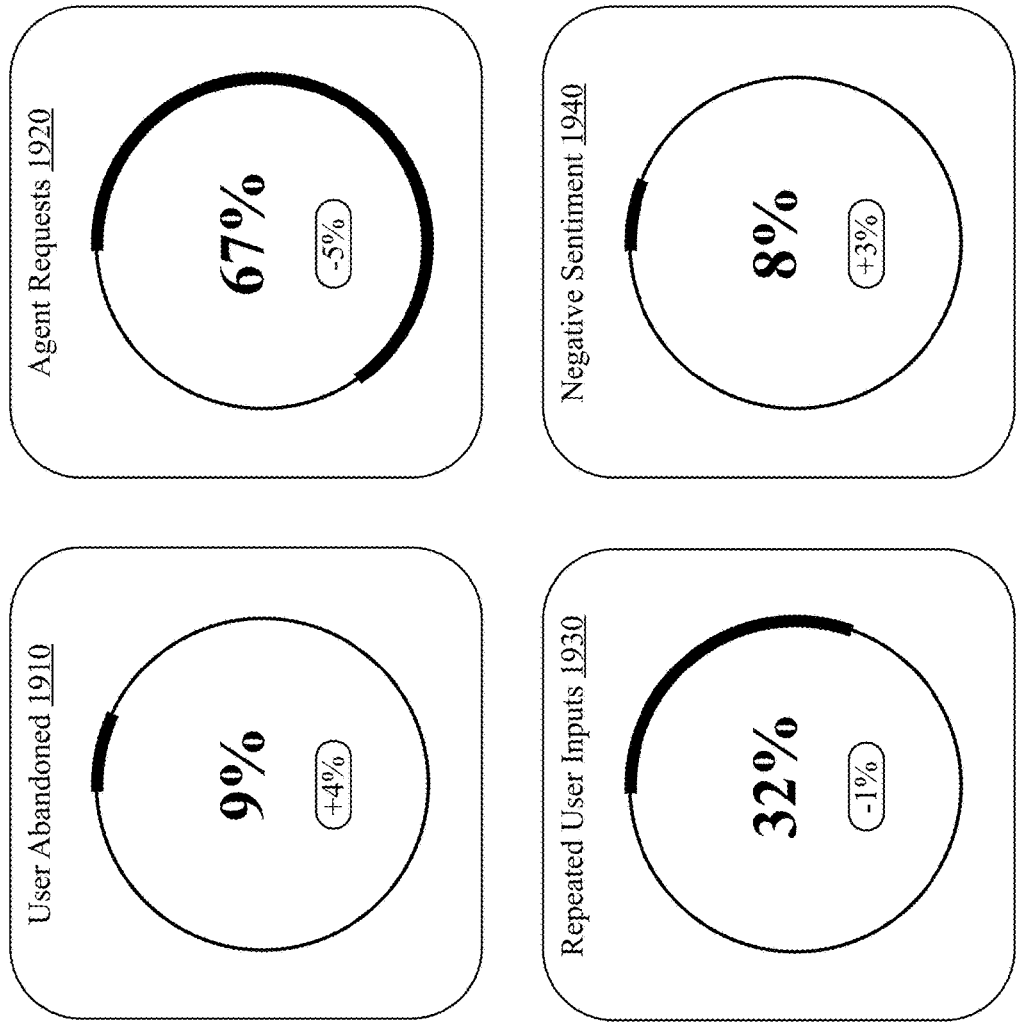
FIG. 19 illustrates additional exemplary analysis results for a system for automated analysis of computerized conversational agent conversational data.

FIG. 19 illustrates additional exemplary analysis results for a system for automated analysis of computerized conversational agent conversational data. In this diagram, several exemplary CCA analysis results 1900 are shown: a user abandoned numerical indicator 1910, an agent requests numerical indicator 1920, a repeated user inputs numerical indicator 1930, and a negative sentiment numerical indicator 1940. These exemplary analysis results describe and explain to the administrator various aspects of the quality of conversations engaged in by a CCA. Note that these examples are not necessarily all related to the same CCA or the same conversational analyses. They are merely indicative of the types of information that may be generated and displayed to an administrator for review and CCA correction.

The user abandoned numerical indicator 1910 shows that 9% of recent conversations were abandoned by the user (a measure of the quality of the conversations being held by the CCA, as user abandonments tend to indicate poor understanding by the CCA of the user's requests), representing a 4% increase from all conversations. The agent requests numerical indicator 1920 shows that 67% of recent conversations resulted in escalation to a human agent (a measure of the quality of the conversations being held by the CCA, as escalations tend to indicate poor understanding by the CCA of the user's requests), representing a 5% decrease from all conversations. The repeated user inputs numerical indicator 1930 shows that 32% of recent conversations had repeated user inputs (a measure of the quality of the conversations being held by the CCA, as repetitions by the user tend to indicate poor understanding by the CCA of the user's requests), representing a 1% decrease from all conversations. The negative sentiment numerical indicator 1940 shows that 8% of recent conversations had negative sentiment assigned to them (a measure of the quality of the conversations being held by the CCA, as negative sentiments tend to indicate poor understanding by the CCA of the user's requests), representing a 3% increase from all conversations.

A further advantage of the system and method described herein is that the analysis results displayed are interactive. For each of the CCA analysis results provided by the system, some or all of the conversations that have produced the analysis results are linked to the analysis results, such that the system allows an administrator to click on the analysis results to quickly view example conversations matching each segment of the feature analysis. This removes a huge time burden from administrators who often have to manually review conversations at random and therefore cannot see the patterns or correlations from the bigger picture. While the analyses are automated, the system provides a framework for detailed manual review of relevant conversations organized by objective so that administrators can immediately see a given problem with CCA quality in the context of a defined objective rather than having to manually search for conversations with similar quality issues.

Exemplary Computer System for Computer-Implemented Aspects and Embodiments

Figure 20:
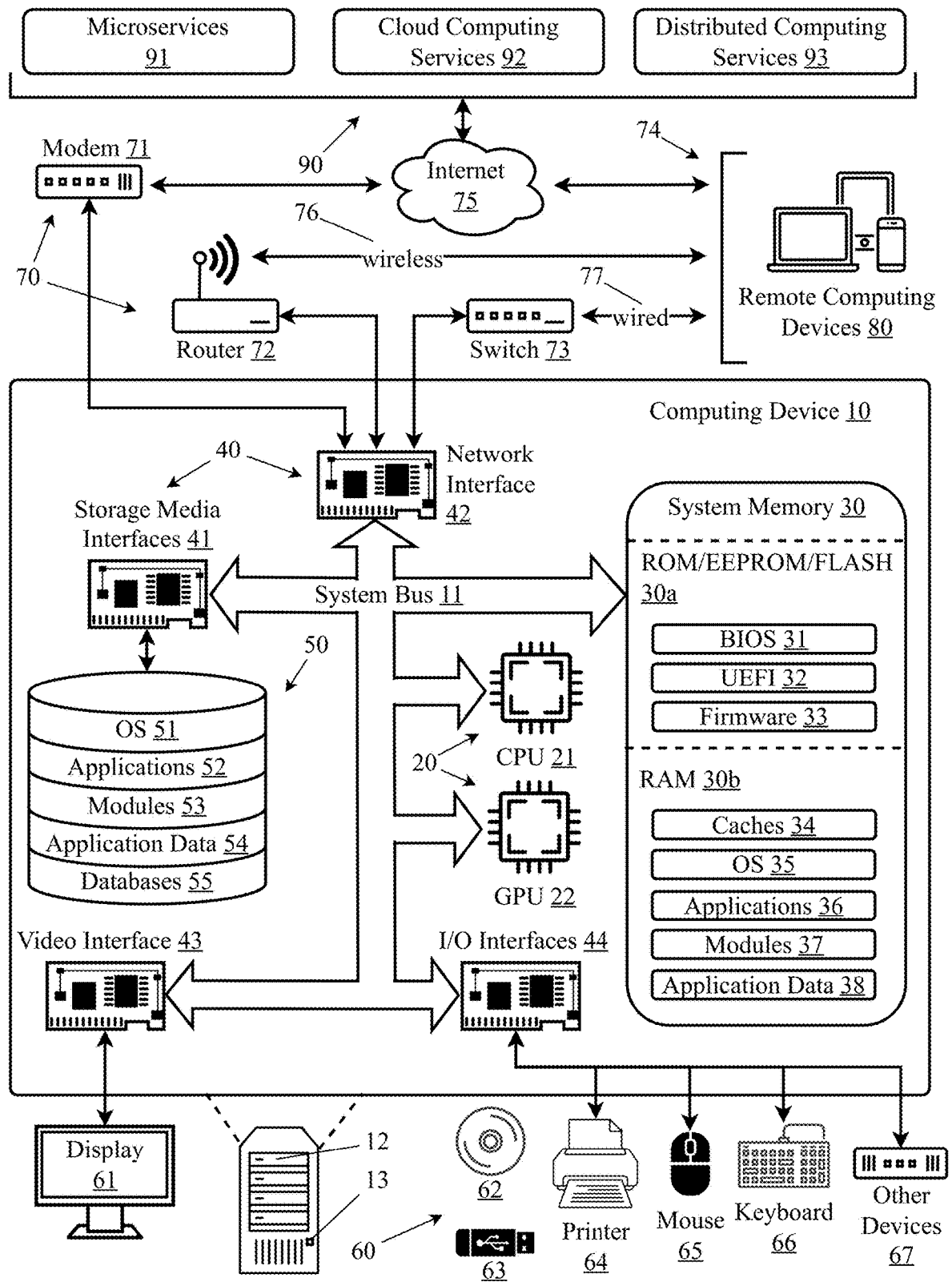
FIG. 20 illustrates an exemplary computer system on which embodiments described herein may be implemented.

FIG. 20 illustrates an exemplary computer system on which embodiments described herein may be implemented, in full or in part. This exemplary computer system describes computer-related components and processes supporting enabling disclosure of computer-implemented embodiments. Inclusion in this exemplary computer system of well-known processes and computer components, if any, is not a suggestion or admission that any aspect or embodiment is no more than an aggregation of such processes or components. Rather, implementation of an aspect or embodiment using processes and components described in this exemplary computer system will involve programming or configuration of such processes and components resulting in a machine specially programmed or configured for such implementation. The exemplary computer system described herein is only one example of such an environment and other configurations of the components and processes are possible, including other relationships between and among components, and/or absence of some processes or components described. Further, the exemplary computer system described herein is not intended to suggest any limitation as to the scope of use or functionality of any embodiment implemented, in whole or in part, on components or processes described herein.

The exemplary computer system described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computer architectures, operating systems, and environments.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computer system are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computer architectures. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A system for automated analysis of computerized conversational agent (CCA) conversational data, comprising:
   a computer system comprising a memory, a processor, and a data store residing on a non-volatile data storage device;

a conversation indicator extractor comprising a first plurality of programming instructions stored in the memory which, when operating on the processor, causes the computer system to:
  receive transcript data for analysis, the transcript data comprising text of one or more conversations between a computerized conversational agent (CCA) and a user, each conversation comprising a plurality of messages, each message being labeled as having been authored either by the CCA or by the user;
  analyze the messages to extract one or more conversational indicators for the one or more conversations;
  associate each conversational indicator with one or more messages of the plurality of messages from which the conversational indicator was extracted; and
  store the conversational indicators and their message associations in the data store;
a fallback analyzer comprising a second plurality of programming instructions stored in the memory which, when operating on the processor, causes the computer system to:
  retrieve from the non-volatile data storage device messages associated with a fallback indicator;
  for each retrieved message:
    extract fallback context from the conversation, the fallback context comprising:
      an agent message indicated as containing a fallback message;
      a customer message preceding the fallback message; and
      an agent message that elicited the customer message preceding the fallback message;
    send the fallback context to an artificial intelligence assistant (AI assistant) with instructions to the AI assistant to assign a fallback type for the fallback message as either intent-based or prompt-based; and
    store the assigned fallback type in the data store;
a topic modeling engine comprising a third plurality of programming instructions stored in the memory which, when operating on the processor, causes the computer system to:
  sample data from the data store according to a sampling time window;
  send the sample data to a natural language understanding (NLU) engine with instructions to generate a list of frequently-occurring topic labels in the form of a term-frequency inverse document frequency (TF-IDF) list;
  receive the TF-IDF list from the NLU engine;
  receive a list of labeled topics from an administrator, or from the data store, or both;
  send the TD-IDF list and the list of labeled topics to a natural language generation (NLG) engine with instructions to assign natural language topic labels for the sample data, wherein the instructions comprise directives to:
    assign a topic label from the list of labeled topics if terms in the TF-IDF list fit a label from the list of labeled topics; and
    assign a topic label from the NLG engine's own judgment if terms in the TF-IDF list do not fit a label from the list of labeled topics; and
  store the assigned topic labels in the data store;
a CCA score generator comprising a fourth plurality of programming instructions stored in the memory which, when operating on the processor, causes the computer system to:
  generate a numerical indicator of conversation quality for one or more of the one or more conversational indicators; and
  display the numerical indicator to an administrator, the display comprising a link from the numerical indicator to one or more messages associated with the conversational indicator.

2. The system of claim 1, wherein the computer system is at least in part a cloud-based, distributed system.

3. The system of claim 1, wherein the conversation indicator extractor extracts conversational indicators comprising one or more of the following types: system message indicators, error message indicators, word count indicators, fallback message indicators, escalation message indicators, response time indicators, conversation turns indicators, agent request indicators, profanity indicators, repeated message indicators, and user abandoned conversation indicators.

4. The system of claim 3, wherein the CCA score generator is further configured to generate an overall CCA score comprising a weighted scoring of the types of conversational indicators extracted.

5. The system of claim 1, further comprising a system configuration manager comprising a fifth plurality of programming instructions stored in the memory which, when operating on the processor, causes the computer system to:
  receive a CCA profile from the administrator, the CCA profile comprising one or more of the following: a name of the CCA, a location from which CCA data can be retrieved, and handover support information for the CCA;
  receive one or more objectives from the administrator for analysis of the transcript data; and
  receive one or more feature selections from the administrator for analysis of the transcript data.

6. The system of claim 5, further comprising a CCA score script generator, comprising a sixth plurality of programming instructions stored in the memory which, when operating on the processor, causes the computer system to generate scripts that combine the profile, objectives, and feature selections into a set of data processing rules that may be used by the CCA score generator to generate the numerical indicators of conversation quality for the one or more of the one or more conversational indicators, or an overall CCA score comprising a weighted scoring of the one or more conversational indicators, or both.

7. The system of claim 1, further comprising a data ingestion engine, comprising a seventh plurality of programming instructions stored in the memory which, when operating on the processor, causes the computer system to:
  receive CCA data;
  where the CCA data is not a transcript, convert the CCA data into a transcript;
  parse the transcript into one or more conversations, the conversations comprising one or more messages between the CCA and the user;
  label each of the one or more messages in the conversations as being from the CCA or from the user; and
  output the transcript data comprising text of one or more conversations between a computerized conversational agent (CCA) and a user, each conversation comprising a plurality of messages, each message being labeled as having been authored either by the CCA or by the user.

8. The system of claim 7, wherein the conversion of the CCA data into a transcript is performed by an automated speech engine in the case of audio CCA data, or by an image-to-text or video-to-text processor for image or video CCA data.

9. A method for automated analysis of computerized conversational agent (CCA) conversational data, comprising the steps of:
using a software conversation indicator extractor operating on a computer system comprising a memory, a processor, and a data store residing on a non-volatile data storage device to perform the steps of:
receiving transcript data for analysis, the transcript data comprising text of one or more conversations between a computerized conversational agent (CCA) and a user, each conversation comprising a plurality of messages, each message being labeled as having been authored either by the CCA or by the user;
analyzing the messages to extract one or more conversational indicators for the one or more conversations;
associating each conversational indicator with one or more messages of the plurality of messages from which the conversational indicator was extracted; and
storing the conversational indicators and their message associations in the data store;
using a software fallback analyzer operating on the computer system to perform the steps of:
retrieving from the non-volatile data storage device messages associated with a fallback indicator;
for each retrieved message:
extracting fallback context from the conversation, the fallback context comprising:
an agent message indicated as containing a fallback message;
a customer message preceding the fallback message; and
an agent message that elicited the customer message preceding the fallback message;
sending the fallback context to an artificial intelligence assistant (AI assistant) with instructions to the AI assistant to assign a fallback type for the fallback message as either intent-based or prompt-based; and
storing the assigned fallback type in the data store;
using a software topic modeling engine operating on the computer system to perform the steps of:
sampling data from the data store according to a sampling time window;
sending the sample data to a natural language understanding (NLU) engine with instructions to generate a list of frequently-occurring topic labels in the form of a term-frequency inverse document frequency (TF-IDF) list;
receiving the TF-IDF list from the NLU engine;
receiving a list of labeled topics from an administrator, or from the data store, or both;
sending the TD-IDF list and the list of labeled topics to a natural language generation (NLG) engine with instructions to assign natural language topic labels for the sample data, wherein the instructions comprise directives to:
assign a topic label from the list of labeled topics if terms in the TF-IDF list fit a label from the list of labeled topics; and
assign a topic label from the NLG engine's own judgment if terms in the TF-IDF list do not fit a label from the list of labeled topics; and
storing the assigned topic labels in the data store;
using a software CCA score generator operating on the computer system to perform the steps of:
generating a numerical indicator of conversation quality for one or more of the one or more conversational indicators; and
displaying the numerical indicator to an administrator, the display comprising a link from the numerical indicator to one or more messages associated with the conversational indicator.

10. The method of claim 9, wherein the computer system is at least in part a cloud-based, distributed system.

11. The method of claim 9, wherein the conversational indicators extracted comprise one or more of the following types: system message indicators, error message indicators, word count indicators, fallback message indicators, escalation message indicators, response time indicators, conversation turns indicators, agent request indicators, profanity indicators, repeated message indicators, and user abandoned conversation indicators.

12. The method of claim 11, wherein the CCA score generator is further configured to perform the step of generating an overall CCA score comprising a weighted scoring of the types of conversational indicators extracted.

13. The method of claim 9, further comprising the step of using a software system configuration manager operating on the computer system to perform the steps of:
receiving a CCA profile from the administrator, the CCA profile comprising one or more of the following: a name of the CCA, a location from which CCA data can be retrieved, and handover support information for the CCA;
receiving one or more objectives from the administrator for analysis of the transcript data; and
receiving one or more feature selections from the administrator for analysis of the transcript data.

14. The method of claim 13, further comprising the step of using a software CCA score script generator, operating on the computer system to perform the steps of:
generating scripts that combine the profile, objectives, and feature selections into a set of data processing rules that may be used by the CCA score generator to generate the numerical indicators of conversation quality for the one or more of the one or more conversational indicators; or
generating an overall CCA score comprising a weighted scoring of the one or more conversational indicators; or both.

15. The method of claim 9, further comprising the step of using a software data ingestion engine operating on the computer system to perform the steps of:
receiving CCA data;
where the CCA data is not a transcript, converting the CCA data into a transcript;
parsing the transcript into one or more conversations, the conversations comprising one or more messages between the CCA and the user;
labeling each of the one or more messages in the conversations as being from the CCA or from the user; and
outputting the transcript data comprising text of one or more conversations between a computerized conversational agent (CCA) and a user, each conversation comprising a plurality of messages, each message being labeled as having been authored either by the CCA or by the user.

16. The method of claim 15, wherein the conversion of the CCA data into a transcript is performed by an automated speech engine in the case of audio CCA data, or by an image-to-text or video-to-text processor for image or video CCA data.

\* \* \* \* \*